United States Patent
Jauzein et al.

(10) Patent No.: US 9,834,031 B2
(45) Date of Patent: Dec. 5, 2017

(54) CHIRAL LIQUID CRYSTAL POLYMER LAYER OR PATTERN COMPRISING RANDOMLY DISTRIBUTED CRATERS THEREIN

(71) Applicant: SICPA HOLDING SA, Prilly (CH)

(72) Inventors: Tristan Jauzein, Lausanne (CH); Brahim Kerkar, Pully (CH)

(73) Assignee: SICPA HOLDING SA, Prilly (CH)

( * ) Notice: Subject to any disclaimer, the term of this patent is extended or adjusted under 35 U.S.C. 154(b) by 798 days.

(21) Appl. No.: 14/134,498

(22) Filed: Dec. 19, 2013

(65) Prior Publication Data
US 2014/0178640 A1   Jun. 26, 2014

Related U.S. Application Data

(60) Provisional application No. 61/750,591, filed on Jan. 9, 2013.

(30) Foreign Application Priority Data

Dec. 20, 2012   (WO) ................ PCT/EP2012/076507

(51) Int. Cl.
*B42D 25/364* (2014.01)
*B42D 25/25* (2014.01)
(Continued)

(52) U.S. Cl.
CPC ............. *B42D 25/364* (2014.10); *B05D 5/00* (2013.01); *B42D 25/23* (2014.10); *B42D 25/24* (2014.10); *B42D 25/25* (2014.10); *B42D 25/29* (2014.10); *B42D 25/405* (2014.10); *C09D 5/29* (2013.01); *C09D 11/00* (2013.01); *C09D 11/50* (2013.01);
(Continued)

(58) Field of Classification Search
CPC ........ C09K 19/588; B42D 25/29; B05D 5/00; G06K 19/02; C09D 11/50
See application file for complete search history.

(56) References Cited

U.S. PATENT DOCUMENTS

| | | | |
|---|---|---|---|
| 6,136,225 | A | 10/2000 | Meyer et al. |
| 6,589,445 | B2 | 7/2003 | Sugiyama et al. |

(Continued)

FOREIGN PATENT DOCUMENTS

| | | |
|---|---|---|
| DE | 19825924 | 12/1999 |
| EP | 0847432 | 6/1998 |

(Continued)

OTHER PUBLICATIONS

Translation of DE 19825924. See IDS filed Mar. 19, 2014 for date and inventor.*

(Continued)

*Primary Examiner* — Victor Chang
(74) *Attorney, Agent, or Firm* — Greenblum & Bernstein, P.L.C.

(57) ABSTRACT

Described is a chiral liquid crystal polymer (CLCP) layer or pattern which comprises randomly distributed craters of controlled mean diameter and/or density. The density and/or mean diameter of the craters can be controlled, for example, by adjusting the wetting of a substrate by a CLCP precursor composition, the development time of the precursor composition, and the thickness of the applied precursor composition.

34 Claims, 2 Drawing Sheets

(51) Int. Cl.
| | |
|---|---|
| B42D 25/24 | (2014.01) |
| B42D 25/23 | (2014.01) |
| C09D 5/29 | (2006.01) |
| B05D 5/00 | (2006.01) |
| G06K 19/02 | (2006.01) |
| C09D 11/50 | (2014.01) |
| C09K 19/58 | (2006.01) |
| B42D 25/405 | (2014.01) |
| B42D 25/29 | (2014.01) |
| G07D 7/202 | (2016.01) |
| C09D 11/00 | (2014.01) |
| C09K 19/04 | (2006.01) |

(52) U.S. Cl.
CPC .......... *C09K 19/586* (2013.01); *C09K 19/588* (2013.01); *G06K 19/02* (2013.01); *G07D 7/2041* (2013.01); *B42D 2033/26* (2013.01); *B42D 2035/24* (2013.01); *B42D 2035/34* (2013.01); *B42D 2035/44* (2013.01); *C09K 2019/0448* (2013.01); *Y10T 428/1352* (2015.01); *Y10T 428/24355* (2015.01)

(56) References Cited

U.S. PATENT DOCUMENTS

| | | | |
|---|---|---|---|
| 7,380,128 | B2 | 5/2008 | Bourrieres et al. |
| 7,647,279 | B2 | 1/2010 | Bourrieres et al. |
| 7,687,271 | B2 | 3/2010 | Gelbart |
| 8,153,984 | B2 | 4/2012 | Olm et al. |
| 8,864,037 | B2 * | 10/2014 | Callegari ............... B42D 25/29 235/454 |
| 2005/0239207 | A1 | 10/2005 | Gelbart |
| 2007/0224341 | A1 | 9/2007 | Kuntz et al. |
| 2009/0033914 | A1 | 2/2009 | Doublet |
| 2010/0307376 | A1 | 12/2010 | Aboutanos et al. |
| 2011/0164748 | A1 | 7/2011 | Kohlert et al. |
| 2011/0293899 | A1 | 12/2011 | Tiller et al. |
| 2012/0171392 | A1 | 7/2012 | Cho et al. |
| 2013/0256415 | A1 | 10/2013 | Callegari et al. |

FOREIGN PATENT DOCUMENTS

| | | |
|---|---|---|
| GB | 2324065 | 10/1998 |
| GB | 2330139 | 4/1999 |
| GB | 2374831 | 10/2002 |
| GB | 2398759 | 9/2004 |
| JP | 07/134288 | 5/1995 |
| JP | 2009-300662 | 12/2009 |
| WO | 93/22397 | 11/1993 |
| WO | 95/22586 | 8/1995 |
| WO | 97/00600 | 1/1997 |
| WO | 01/57831 | 8/2001 |
| WO | 2007/060133 | 5/2007 |
| WO | 2008/000755 | 1/2008 |
| WO | 2008/128714 | 10/2008 |
| WO | 2010/115879 | 10/2010 |
| WO | 2011/069689 | 6/2011 |
| WO | 2011/069690 | 6/2011 |
| WO | 2011/069691 | 6/2011 |
| WO | 2011/069692 | 6/2011 |
| WO | 2012/076533 | 6/2012 |
| WO | 2012/076534 | 6/2012 |
| WO | 2013/143829 | 10/2013 |

OTHER PUBLICATIONS

International Search Report and Written Opinion in regards to International Application No. PCT/EP2012/076507, dated Nov. 25, 2013.
J. L. Fergason, Molecular Crystals, vol. 1, 1966, pp. 293-307.
http://www.prooftag.net/en/technology/bubble-tag (2 pages) downloaded Mar. 16, 2014.
http://www.prooftag.net/en/technology (1 page) downloaded Mar. 16, 2014.
Chinese Office Action (with English translation) in respect to Chinese Application No. 201380066555, dated Feb. 29, 2016.
Official communication issued from European Patent Office in counterpart European Application No. 13805385.5 dated Jan. 19, 2017.

* cited by examiner

CHIRAL LIQUID CRYSTAL POLYMER LAYER OR PATTERN COMPRISING RANDOMLY DISTRIBUTED CRATERS THEREIN

CROSS-REFERENCE TO RELATED APPLICATIONS

The present application claims the benefit under 35 U.S.C. §119(e) of U.S. Provisional Application No. 61/750,591, filed Jan. 9, 2013, and claims priority under 35 U.S.C. §119 of International Application No. PCT/EP2012/076507, filed Dec. 20, 2012. The entire disclosures of these applications are expressly incorporated by reference herein.

BACKGROUND OF THE INVENTION

1. Field of the Invention

The present invention relates to a chiral liquid crystal polymer (CLCP) layer or pattern that comprises randomly distributed craters of controlled mean diameter and/or density therein. The layer or pattern can be used as a marking on an article or item for identification and/or authentication purposes by exploiting not only the unique optical properties of the CLCP material but also the unique random distribution of the craters.

2. Discussion of Background Information

Every minute billions of items, services and goods are exchanged between people around the world. Some are immaterial and some are tangible, such as, e.g., pharmaceuticals, luxury goods, cigarettes, wine, olive oil, food or banknotes, used for different purposes such as to cure a disease, to provide pleasant moments, to protect us, to pay for something or simply for eating. Although the majority of said items, services and goods is genuine, there is a small part of them that is fake or counterfeit and even worse, may be toxic, especially in the pharmaceutical field or in the case of alcoholic goods. There is not a single day where there will not be a newspaper article somewhere around the world that reports of corresponding problems. This is becoming an increasingly critical problem for all nations and affects not only the economy (at issue are about hundred billions of diversion and counterfeit products) but unfortunately also affects the health of human beings.

For decades attempts to solve this problem have successfully been made, but unfortunately always only for a limited period of time because counterfeiters which now are also linked to criminal organisations develop and improve their skills in parallel with the evolution of the technology and are able to offer to customers fake or non-genuine products which cannot be distinguished from the genuine products by mere visual inspection. This forces the providers of security solutions to constantly be not only up to date, but to be ahead of the counterfeiters in terms of new security features.

In the early days of the development of security features the simple addition of fluorescent compounds to a specific ink was sufficient and may even today still be sufficient as a first level of protection against counterfeit or fake products. But as is often the case, new fake products with markings which mimic the genuine ones have emerged and make it necessary to develop ever more sophisticated and complex inks to overcome this problem.

Another type of security features which has been in use for the last twenty years or so is based upon the random distribution of particles inside a medium. These security features not only deter the selling of counterfeit products because they are difficult to forge, but also provide the ability to create a unique identifier for the items or goods that comprise these security features.

For example, GB 2324065, the entire disclosure of which is incorporated by reference herein, relates to a code that comprises a two- or three-dimensional plastic matrix having embedded therein randomly-positioned visually distinguishable beads. The position of the beads is read and recorded as an identification code, e.g. by recording the position of a sequence of beads above or below a line representative of the ones and zeros in a binary code. The binary code can be read and stored in a database as an identifier of a banknote. Two or more codes may be used, one hidden and one visible, with both codes being recorded.

GB 2374831, the entire disclosure of which is incorporated by reference herein, relates to a signature obtained with a set of particles having a reflective and/or refractive layer or component which are randomly distributed three-dimensionally in a light transmitting matrix on a substrate to provide a security tag. Light reflection/refraction by the particles generates an optical signature which is interpreted by a reader. The signature, which may include the particle coordinates, may be stored in an encrypted or unencrypted form locally or on a central database. The authenticity of a tag is determined by comparing the signature read from it with previously stored data.

US2005/0239207, the entire disclosure of which is incorporated by reference herein, discloses an authentication system that uses the unique random distribution of an invisible taggant as a "signature" to identify an item. The verification is error tolerant and the taggant is made visible to a camera by special illumination. Inert taggants with no optical activity can also be used and made visible by their thermal properties.

U.S. Pat. No. 8,153,984, the entire disclosure of which is incorporated by reference herein, discloses a security marker material that comprises emissive particles selected from at least two groups with different size distributions. The size distributions satisfy the formulae $(x-z)2/(Sx2+Sz2)]^{1/2}>1$ wherein x and z are the volume-weighted mean equivalent-spherical diameters of the two particle distributions and Sx and Sz are the standard deviations of the same two distributions. The emissive materials are placed in or on an item. The emissive materials are excited with electromagnetic radiation in one or more specified spectral bands. The electromagnetic radiation is detected in one or more spectral bands from the emissive materials in an image-wise fashion. The attributes of the image are analyzed and characterized and are compared to authentication criteria to determine the authenticity of the marked item. The distribution of the emissive particles is random.

US 2011/0164748, the entire disclosure of which is incorporated by reference herein, relates to a packaging film which contains pigment particles randomly distributed in a low surface-area density and is used for the authentication of products. An imaging device is used to record a first digital image of a packaged product. The positional coordinates, and optionally the color values, of the pigment particles contained in the packaging film are determined from the digital image by means of a computer program and an identification code is calculated from the coordinate or color values and stored in a database. To authenticate the product at a later time, a second digital image is recorded and a test code is determined and compared with the recorded identification code. The number of particles does not exceed 100 particles per $cm^2$ on the surface of the packaging.

WO 2001/57831, the entire disclosure of which is incorporated by reference herein, discloses a method for reading single volume and non-reproducible identification means in the form of a random distribution of bubbles which are present in a polymeric medium. The method consists in recognizing in two dimensions the internal heterogeneous structure of said identification means (bubbles inside the medium) and in isolating and demonstrating its third dimension, thereby eliminating the risk of imposture. Said characteristic makes it possible to reduce storage volume and the periods of time required for scanning, acquisition and comparison operations performed in such processes.

The random distribution of particles in a medium remains a method which is useful for generating a specific and unique code that helps in the fight against counterfeiters. However, the corresponding techniques are not without drawbacks, especially when a low number of particles which serve as a basis of identification and coding is used. With a low number of particles it is easy to determine the position of each (pigment) particle and then to reproduce its position and also to mimic the pigments that are used to generate the unique code. Of course, one way of avoiding this drawback and to enhance the level of protection is to increase the number of pigments and/or particles used and the complexity thereof, which inevitably has an impact on the cost of such solutions and the complexity of the devices required to detect a high number of particles and to generate the corresponding code.

Another drawback of the existing method of the state of the art is the fact that these techniques are strongly dependent on the nature of the particles and the ability of the device used to generate the code, to determine precisely whether or not the pigments are present or not. Multiple readings of the same sample may sometimes lead to different codes. For example, the medium which contains the particles or the bubbles must not interact therewith, and must be as inert as possible toward the particles in order to obtain from these particles the maximum of information they carry. In other words, the previously described techniques are useful for a first level of protection, with the ability to generate a unique identifier, but are strongly dependent on the nature of the particles or the process for generating the bubbles, may be subject to reproduction and have an impact on the cost of corresponding solutions as soon as they require more materials in the form of a pigment. The CLCP flakes (which are similar to small mirrors) are viewed under specular observation which means that the reading will vary with the observation angle.

There is therefore a need for an improved security feature which provides a higher level of protection (above the first level), is cost effective and still is based on the random distribution of particles or an equivalent thereof for being able to generate a unique code that overcomes the drawbacks of the prior art.

It has surprisingly been found that the drawbacks of the prior art can be overcome by using a particular medium which comprises the equivalent of a random particle distribution and at the same time can also serve as an authentication and security feature.

SUMMARY OF THE INVENTION

The present invention provides a CLCP layer or pattern which comprises randomly distributed craters of controlled mean diameter and/or density therein. The term "density", without indication to the contrary, is used to define the number of craters per $cm^2$. The mean diameter is used to define the size of the opening of the craters.

The CLCP layer or pattern comprising randomly distributed craters in at least a part thereof is obtainable, for example, by applying a CLCP precursor composition onto a substrate in the form of a layer or pattern, optionally heating the applied CLCP precursor composition to promote the chiral liquid crystal state thereof, and curing the precursor composition in the chiral liquid crystal state to form a CLCP layer or pattern and controlling. The at least one parameter which affects the formation, the mean diameter and/or the density (number of craters per $cm^2$) of the randomly distributed craters formed in the layer or pattern is controlled. The at least one parameter may be, for example, one or more parameters selected from the degree of wetting of the substrate by the precursor composition, the length of the time period that has elapsed between the application and the curing of the precursor composition, the thickness of the applied layer or pattern of the precursor composition, the viscosity of the precursor composition, and the method of applying the precursor composition onto the substrate.

The at least one controlled parameter which affects the formation of the craters, and the mean diameter and/or density of the randomly distributed craters may comprise the degree of wetting of the substrate by the precursor composition. The degree of wetting of the substrate by the precursor composition may be controlled, for example, by adjusting (changing) the surface tension of the precursor composition (for example, by incorporating one or more surfactants therein) and/or by adjusting the surface tension of the surface of the substrate onto which the precursor composition is to be applied (for example, by providing the substrate in at least a part of the surface of the substrate onto which the precursor composition is to be applied with a coating having a surface tension that is different from the surface tension of the substrate). For example, the surface tension of the precursor composition for making the CLCP layer or pattern may be, or may be made to be, higher than the surface tension of the substrate or the coating onto which it is to be applied. The difference between the surface tension of the substrate and/or the coating and the surface tension of the CLCP precursor composition may, for example, be in the range of from 0.1 mN·m to 10 mN·m, preferably from 0.5 mN·m to 5 mN·m.

If one or more surfactants are to be added to the CLCP precursor composition in order to adjust/change the surface tension thereof, the one or more surfactants may be present in the CLCP precursor composition in a (total) concentration such as to have a surface tension of the CLCP higher than the substrate and/or any intermediate layer in contact with the CLCP. The one or more surfactants preferably included in the CLCP precursor composition to provide the range of difference in surface tension of from 0.1 mN·m to 10 mN·m, preferably from 0.5 mN·m to 5 mN·m.

The mean diameter of the craters, the number of craters, as well as the density can vary with the difference in surface tension between the CLCP and the substrate or intermediate layer in contact with the CLPC. For example, the greater the difference in surface tension, the higher the numbers of craters and the greater the mean diameter.

The surfactants are preferably selected from polysiloxane surfactants and fluorinated surfactants. The concentration is preferably from 0.01% to 1% by weight, based on the total weight of the precursor composition.

The CLCP precursor composition for making the layer or pattern may comprise at least one nematic compound, at least one chiral dopant, at least one photoinitiator and, optionally, at least one solvent.

The randomly distributed craters may have an mean diameter of from 1 μm to 1000 μm, preferably of from 10 μm to 500 μm. The craters may be visible to the unaided human eye or invisible to the unaided human eye, or a part thereof may be visible and a part thereof may be invisible to the unaided human eye. Further, the average number of craters per $cm^2$ in at least one area of the layer or pattern may, for example, be from 1 to 500, e.g., from 2 to 300, or from 3 to 200, and, preferably, from 5 to 50. In case of craters with a non-circular cross section, the "diameter" will be the greatest distance of the opening of the crater. The "mean diameter" comprises an average diameter of the craters over a statistically significant number of craters, preferably 20 adjacent craters.

The color-shift properties of the layer or pattern across the layer or pattern may be non-uniform (e.g., may have been modified in one or more areas thereof).

The layer or pattern may comprise at least one material that has a detectable property that is different from a property of the CLCP layer or pattern itself. For example, the at least one material may be selected from one or more of flakes, fibers, inorganic compounds, organic compounds, dyes, pigments, absorber materials absorbing electromagnetic radiation in the UV and/or visible and/or IR range, luminescent materials, fluorescent materials, phosphorescent materials, colored materials, photochromic materials, thermochromic materials, magnetic materials, and materials having one or more detectable particle size distributions. The at least one material may be present in the composition for making the layer or pattern in an individual concentration of, e.g., from 0.001% to 1% by weight, based on the total weight of the precursor composition. The at least one material may comprise one or more functionalities which allow it to become chemically bonded to the composition for making the layer or pattern.

Further, if by applying according to the present invention is present on a substrate (support), the substrate may, for example, be at least one of a label, packaging, a cartridge, a container or a capsule that contains foodstuffs, nutraceuticals, pharmaceuticals, or beverages, a banknote, a credit card, a stamp, a tax label, a security document, a passport, an identity card, a driver's license, an access card, a transportation ticket, an event ticket, a voucher, an ink-transfer layer, a reflective layer, an aluminum foil, a semiconductor, and a commercial good. Further, at least a part of the CLCP layer or pattern may be present in the form of one or more of an image, a picture, a logo, indicia, and a pattern representing a code selected from one or more of a 1-dimensional barcode, a stacked 1-dimensional barcode, a 2-dimensional barcode, a 3-dimensional barcode, a cloud of dots, and a data matrix.

At least one intermediate layer or pattern may be present between the substrate and the CLCP layer or pattern in at least a part of the substrate that has thereon the CLCP layer or pattern (or at least a part thereof). For example, the at least one intermediate layer or pattern may comprise a varnish such as, e.g., a UV-cured varnish. The varnish may be IR transparent.

At least one surface of the substrate and/or the at least one intermediate layer or pattern may comprise at least one material that has a detectable property that is different from a property of the CLCP layer or pattern. The at least one material may be selected, for example, from one or more of flakes, fibers, inorganic compounds, organic compounds, dyes, pigments, absorber materials absorbing electromagnetic radiation in the UV and/or visible and/or IR range, luminescent materials, fluorescent materials, phosphorescent materials, colored materials, photochromic materials, thermochromic materials, magnetic materials, and materials having one or more detectable particle size distributions.

The at least one surface of the substrate and/or the at least one intermediate layer or pattern may comprise one or more areas having a design that is within a perimeter of a crater that is comprised in the CLCP layer or pattern according to the present invention. For example, the design may have a surface area that is smaller than the cross section of an opening of a crater, whereby the design is exposed by the opening of the crater. Non-limiting examples of suitable designs include microdots, microtaggants, micromarkings, and micro alphanumeric characters, as well as clouds of dots such as, e.g, distributions of particles or flakes, sums of glyphs, and tags on a surface having an optically readable background pattern with encoded information therein.

The substrate or the at least one intermediate layer or pattern may include an area that has non-uniform optical property across its surface. The non-uniform optical property may include, for example, a color variation and/or a pattern variation.

The at least one intermediate layer or pattern may comprise in at least a part thereof a CLCP that has an optical (spectral) property which is different from an optical property of the CLCP layer or pattern.

The surface tension of the composition for making the CLCP layer or pattern should be higher than the surface tension of the substrate or the intermediate layer or pattern onto which it is applied (after evaporation of the solvent and other volatile matter optionally comprised in the composition). For example, the difference between the surface tension of the substrate and/or the intermediate layer or pattern and the surface tension of the CLCP precursor composition may be in the range of from 0.1 mN·m to 10 mN·m, preferably from 0.5 mN·m to 5 mN·m.

At least one transparent top layer or pattern may be present on at least a part of the CLCP layer or pattern. As in the case of an optionally present intermediate layer or pattern between the substrate and the CLCP layer or pattern according to the present invention, the top layer or pattern may comprise at least one material that has a detectable property that is different from a property of the CLCP layer or pattern. The at least one material may be selected, for example, from one or more of flakes, fibers, inorganic compounds, organic compounds, dyes, pigments, absorber materials absorbing electromagnetic radiation in the UV and/or visible and/or IR range, luminescent materials, fluorescent materials, phosphorescent materials, colored materials, photochromic materials, thermochromic materials, magnetic materials, and materials having one or more detectable particle size distributions.

There is also provided a method of forming a CLCP layer or pattern according to the present invention by applying a CLCP precursor composition onto a substrate in the form of a layer or pattern, optionally heating the applied CLCP precursor composition to promote the chiral liquid crystal state thereof, and curing the CLCP precursor composition in the chiral liquid crystal state to form a layer or pattern having randomly distributed craters therein. The method can include controlling the mean diameter and/or density of randomly distributed craters formed in the layer or pattern by controlling at least one parameter selected from, for example, one or more of the degree of wetting of the substrate by the precursor composition, the length of the time period elapsing between the application and the curing of the precursor composition, the thickness of the applied layer or pattern of the precursor composition, the viscosity of the precursor composition, and the method of applying the precursor composition onto the substrate.

There is also included herein use of the CLCP layer or pattern for identifying and/or authenticating and/or tracking an article or item having the layer or pattern thereon is also in accordance with the present invention.

At least one optical (e.g. spectral) property of the CLCP layer or pattern as well as the density and/or the mean diameter of the randomly distributed craters therein can be exploited for identifying and/or authenticating and/or tracking the article or item, optionally in addition to one or more other properties which may be provided by, e.g., the at least one material having at a detectable property that is different from a property of the CLCP layer or pattern as set forth above (which material may be present in the CLCP layer or pattern itself and/or in an intermediate layer or pattern and/or in a top layer or pattern and/or on a surface of the substrate).

The article may be or may comprise at least one of a label, packaging, a cartridge, a container or a capsule that contains foodstuffs, nutraceuticals, pharmaceuticals, or beverages, a banknote, a credit card, a stamp, a tax label, a security document, a passport, an identity card, a driver's license, an access card, a transportation ticket, an event ticket, a voucher, an ink-transfer layer, a reflective layer, an aluminum foil, a semiconductor, and a commercial good and/or at least a part of the CLCP layer or pattern may be present in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, a cloud of dots, and a data matrix.

There is also provided a marking that comprises a CLCP layer or pattern. The CLCP layer or pattern comprises randomly distributed craters of controlled mean diameter and/or controlled density to provide randomly distributed craters having a size and/or density permitting identification of the marking. For example, an interrelationship between size and density of the randomly distributed craters may permit identification of the marking.

The present invention also provides a marking that comprises a CLCP layer or pattern comprising randomly distributed craters therein. The craters have a mean diameter of from 5 μm to 1000 μm, preferably from 10 μm to 500 μm. In at least one area of the layer or pattern, the average number of craters per cm² of layer or pattern is from 1 to 500, preferably from 5 to 50.

There is further provided a method of marking an article or item. The method can include a marking applied on the item or article. The marking may, for example, be applied directly to the article or item, or it may be applied to a substrate and the substrate having the marking thereon may be applied to the article or item.

The is further provided a method of at least one of identifying, authenticating and tracking an article or item. The method can include applying a marking to the article or item, and comparing the mean diameter and/or density and/or distribution of the craters with the mean diameter and/or density and/or distribution of craters previously determined (e.g., recorded and stored in a computer database) for the marking to identify, authenticate and/or track the article or item. Further, at least one optical property of the CLCP layer or pattern may additionally be detected for identifying, authenticating and/or tracking the article or item.

There is also provided a (preferably polymeric) layer or pattern on a substrate, the layer or pattern comprising randomly distributed craters of controlled mean diameter and/or controlled density. The layer or pattern can preferably comprise a cured polymeric material and may be obtained, for example, by applying a curable polymeric composition onto a substrate in the form of a layer or pattern that comprises randomly distributed craters in at least a part of the layer or pattern and curing the thus applied composition. At least one parameter which affects the mean diameter and/or the density of the randomly distributed craters is controlled.

BRIEF DESCRIPTION OF THE DRAWINGS

The present invention is further described in the detailed description which follows, in reference to the plurality of drawings by way of non-limiting examples of exemplary embodiments of the present invention, wherein.

DETAILED DESCRIPTION OF THE PRESENT INVENTION

Figure 1:
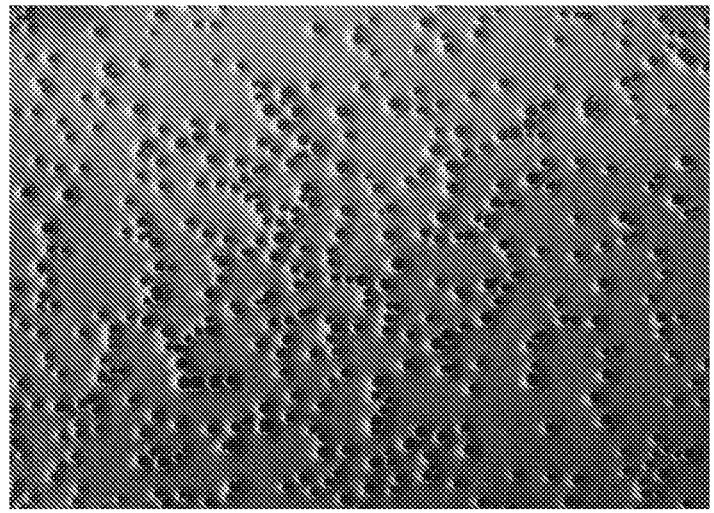
FIG. 1 is a photograph of a first embodiment of a CLCP layer with randomly distributed craters according to the present invention

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The CLCP layer (e.g., film) or (regular or irregular) pattern of the present invention comprises randomly distributed craters (holes and/or pinholes) of controlled mean diameter and/or controlled density. The randomly distributed craters may (and often will) be substantially circular or even perfectly circular. It is to be appreciated, however, that the craters may also be, or may include craters having shapes which are not circular but are, e.g., ellipsoidal. In this case the shape of the craters can also provide a fingerprint which can be used to create a code which is based not merely on the density and/or size (diameter) and/or distribution of the craters, but also on the shape of (some or all of) the craters. The CLCP layer or pattern may be present as such. It may also be present on a temporary or permanent support, for example, a polymer film (made from, e.g., a polyester such as PET, or from a polyolefin and optionally, together with one or more layers and/or patterns below and/or above the CLCP layer) from which it can be removed (e.g., peeled) and thereafter placed on an article or item to serve as marking for identification, authentication and/or tracking purposes.

By comprising randomly distributed craters of controlled density and/or size, the CLCP layer or pattern according to the present invention can provide a unique and virtually impossible to copy/reproduce marking for a substrate (e.g., an article or item) provided therewith. In addition, the virtually impossible to copy/reproduce optical properties of the CLCP material itself (including, e.g., circular reflected polarized light, position of at least one spectral reflection band, visibility with the unaided eye, etc.) can also be used to provide a further level of protection associated with the marking. Still further, including one or more materials with detectable properties that are different from the properties of the CLCP material in the layer or pattern itself and/or in an optional intermediate layer or pattern present between the substrate and the CLCP layer or pattern and/or in an optional top layer or pattern present on top of the CLCP layer or pattern and/or in the substrate can increase the security provided by the marking even further.

The CLCP layer or pattern according to the present invention may be obtained, for example, by applying a liquid CLCP precursor composition onto a (preferably non-fibrous) substrate (a temporary or permanent support) in the form of a layer or pattern, optionally heating the applied composition to promote the chiral liquid crystal state thereof, and curing the CLCP precursor composition to form the layer or pattern having randomly distributed craters in at least a part thereof and by controlling at least one parameter which affects the mean diameter and/or density of the randomly distributed craters comprised in the CLCP layer or pattern.

The at least one parameter which affects the mean diameter and/or the density of the randomly distributed craters may, for example, include the degree of wetting of the substrate (or intermediate layer) by the precursor composition. The degree of wetting depends on the difference between the surface tension of the CLCP precursor composition and the surface tension of the substrate (or intermediate layer). For example, if the precursor composition wets the substrate well (i.e., the difference between the surface tension of the substrate and the surface tension of the CLCP precursor composition after evaporation of volatile matter is small), the density and the mean diameter of the craters tend to be small. Conversely, an increasingly larger difference between the surface tensions of the substrate and the CLCP precursor composition will result in an increasingly higher number and/or mean diameter of formed craters.

The degree of wetting of the substrate by the precursor composition may be controlled by, for example, adjusting (changing) the surface tension of the precursor composition. It may also be controlled by adjusting the surface tension of the surface of the substrate onto which the precursor composition is to be applied. The surface tension of the surface of the substrate onto which the precursor composition is to be applied can be adjusted, for example, by providing the substrate at least in a part of the surface thereof onto which the precursor composition is to be applied with a coating that has a surface tension that is different from the surface tension of the substrate. A preferred difference between the surface tension of the substrate (or a coating provided on the substrate or an intermediate layer) and the surface tension of the CLCP precursor composition (after evaporation of volatile matter optionally comprised therein) will often be from 0.1 mN·m to 10 mN·m, preferably from 0.5 mN·m to 5 mN·m. Preferably, the surface tension of the precursor composition (after evaporation of volatile matter) is higher than the surface tension of the surface of the substrate or the coating onto which the composition is to be applied. Examples of suitable substrates include paper substrates and polymeric substrates such as, e.g., polyester substrates and substrates made from polyolefin (e.g., from polypropylene or polyethylene). Polyester substrates show a relatively high surface tension, wherefore their wettability by a precursor composition is usually better than the wettability of polyolefin substrates, which usually exhibit a relatively low surface tension.

The surface tension of the CLCP precursor composition can be changed by, for example, incorporating one or more surfactants therein. Non-limiting examples of suitable surfactants include polysiloxane surfactants and fluorinated surfactants (e.g., surfactants based on polytetrafluoroethylene). The efficiency of a surfactant for lowering the surface tension of a specific precursor composition depends mainly on the structure of the surfactant and can be determined by simple experimentation. In this regard, it is to be kept in mind that adding too much surfactant to a precursor composition may impair the wetting properties of the composition. In many cases a suitable (total) concentration of the one or more surfactants in the precursor composition, if present, will be in the range of from 0.01% to 1% by weight, based on the total weight of the precursor composition.

Other parameters which can be used to control the mean diameter and/or density of randomly distributed craters include (in addition to the amounts and types of surfactants and other components which may optionally be added to the CLCP precursor composition, examples of which are set forth below) the length of the period of time that elapses between the application and the curing of the precursor composition (sometimes referred to herein as "development time", which period of time may, for example, be not shorter than 2 seconds and not longer than 30 seconds), the thickness of the applied layer or pattern of the precursor composition, the viscosity of the precursor composition, and the method of applying the precursor composition onto the substrate. The effect of some of these parameters on the mean diameter and density of the craters is illustrated in the Examples below.

In the CLCP layer or pattern according to the present invention the randomly distributed craters preferably have an mean diameter (i.e., average largest dimension as determined by, e.g., use of a suitable microscope, based on the largest dimensions of preferably at least 10 craters, e.g., at least 20 craters, and preferably using 20 craters adjacent to each other in determining the mean diameter, in a selected area of the CLCP layer or pattern) of at least 1 μm, e.g., at least 2 μm, at least 3 μm, at least 4 μm, at least 5 μm, at least 10 μm, at least 20 μm, at least 30 μm, at least 40 μm, at least 50 μm, at least 80 μm, at least 100 μm, or at least 200 μm. The mean diameter of the craters is preferably not higher than 1000 μm, e.g., not higher than 900 μm, not higher than 800 μm, not higher than 700 μm, not higher than 600 μm, or not higher than 500 μm. Of course, this does not exclude the presence of individual craters which are significantly smaller than 1 μm or significantly larger than 1000 μm. The craters may be visible to the unaided human eye or invisible to the unaided human eye, or a part thereof may be visible and a part thereof may be invisible to the unaided human eye.

The average number of craters per $cm^2$ in at least one area of the layer or pattern preferably is at least 1, e.g., at least 2, at least 3, at least 4, or at least 5, and not higher than 500, e.g., not higher than 300, not higher than 200, not higher than 100, not higher than 50, or not higher than 25.

The CLCP precursor composition for making the layer or pattern may comprise at least one nematic compound, at least one chiral dopant, at least one photoinitiator and, optionally, at least one solvent. Non-limiting examples of corresponding compositions are disclosed in, for example, WO 2008/000755, WO 2010/115879, WO 2011/069689, WO 2011/069690, WO 2011/069691, and WO 2011/069692, the entire disclosures of which are incorporated by reference herein.

By way of background, cholesteric (chiral) liquid crystals exhibit a viewing-angle dependent color. When illuminated with white light the cholesteric liquid crystal structure reflects light of a predetermined color (predetermined wavelength range) which is a function of the employed materials and generally varies with the angle of observation and the temperature. The precursor material itself is colorless and the observed color (predetermined wavelength range) is only due to a physical reflection effect at the cholesteric helical structure adopted at a given temperature by the liquid crystal material (cf. J. L. Fergason, Molecular Crystals, Vol. 1, pp. 293-307 (1966), the entire disclosure whereof is incorporated by reference herein). In particular, in liquid crystal materials the cholesteric helical structure is "frozen" in a predetermined state through polymerization and thus rendered temperature-independent.

The chiral nematic liquid crystal phase is typically composed of nematic mesogenic molecules which comprise a chiral dopant that produces intermolecular forces that favor alignment between molecules at a slight angle to one another. The result thereof is the formation of a structure which can be visualized as a stack of very thin 2-D nematic-like layers with the director in each layer twisted with respect to those above and below. An important characteristic of the chiral nematic liquid crystal phase is the pitch p. The pitch p is defined as the (vertical) distance it takes for the director to rotate one full turn in the helix.

A characteristic property of the helical structure of the chiral nematic phase is its ability to selectively reflect light whose wavelength falls within a specific range. When this range overlaps with a portion of the visible spectrum a colored reflection will be perceived by an observer. The center of the range is approximately equal to the pitch multiplied by the average refractive index of the material. One parameter which has an influence on the pitch is the temperature because of the dependence thereon of the gradual change in director orientation between successive layers which modifies the pitch length, resulting in an alteration of the wavelength of reflected light as a function of the temperature.

A non-limiting example of a CLCP precursor composition that is suitable for use in the present invention comprises (A) from 20% to 99.5% by weight, based on the total weight of the composition, of at least one three-dimensionally crosslinkable nematic compound of formula $$Y^1\text{-}A^1\text{-}M^1\text{-}A^2\text{-}Y^2$$

wherein $Y^1$, $Y^2$ are equal or different, and represent polymerizable groups;

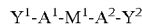 are equal or different residues of the general formula $C_nH_{2n}$, wherein n is 0 or an integer of from 1 to 20, and wherein at least one methylene group may be replaced by an oxygen atom;

$M^1$ is of formula —$R^1$—$X^1$—$R^2$—$X^2$—$R^3$—$X^3$—$R^4$—
wherein $R^1$ to $R^4$ are equal or different bivalent residues selected from —O—, —COO—, —COHN—, —CO—, —S—, —C═C—, CH—CH—, —N═N—, —N═N(O)—, and a C—C bond; and $R^2$—$X^2$—$R^3$ or $R^2$—$X^2$ or $R^2$—$X^2$—$R^3$—$X^3$ may as well be a C—C bond;

$X^1$ to $X^3$ are equal or different residues selected from 1,4-phenylene; 1,4-cyclohexylene; heteroarylenes having from 6 to 10 atoms in the aryl core, 1 to 3 of which are heteroatoms selected from O, N, and S, and carrying substituents $B^1$, $B^2$ and/or $B^3$; cycloalkylenes having from 3 to 10 carbon atoms and carrying substituents $B^1$, $B^2$ and/or $B^3$; wherein $B^1$ to $B^3$ are equal or different substituents selected from hydrogen, $C_1$-$C_{20}$-alkoxy, $C_1$-$C_{20}$-alkylthio, $C_1$-$C_{20}$-alkylcarbonyl, alkoxycarbonyl, $C_1$-$C_{20}$-alkylthiocarbonyl, —OH, —F, —Cl, —Br, —I, —CN, —NO$_2$, formyl, acetyl, and alkyl-, alkoxy-, or alkylthio-residues with 1 to 20 carbon atoms having a chain interrupted by ether oxygen, thioether, sulfur or ester groups; and (B) from 0.5% to 80% by weight, based on the total weight of the composition, of at least one chiral compound of the formula $$V^1\text{-}A^1\text{-}W^1\text{—}Z\text{—}W^2\text{-}A^2\text{-}V^2$$

wherein $V^1$, $V^2$ are equal or different and represent a residue of the following: acrylate, methacrylate, epoxy, vinyl ether, vinyl, isocyanate, $C_1$-$C_{20}$-alkyl, $C_1$-$C_{20}$-alkoxy, alkylthio, $C_1$-$C_{20}$-alkylcarbonyl, $C_1$-$C_{20}$-alkoxycarbonyl, $C_1$-$C_{20}$-alkylthiocarbonyl, —OH, —F, —Cl, —Br, —I, —CN, —NO$_2$, formyl, acetyl, as well as alkyl-, alkoxy-, or alkylthio-residues with 1 to 20 carbon atoms having a chain interrupted by ether oxygen, thioether sulfur or ester groups, or a cholesterol residue;

$A^1$, $A^2$ are as indicated above;

$W^1$, $W^2$ are of formula —$R^1$—$X^1$—$R^2$—$X^2$—$R^3$—
wherein $R^1$ to $R^3$ are as indicated above, and wherein $R^2$ or 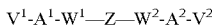 or $X^1$—$R^2$—$X^2$—$R^3$ may also be a C—C bond;

$X^1$, $X^2$ are as indicated above;

Z is a divalent chiral residue chosen from dianhydrohexites, hexoses, pentoses, binaphthyl derivatives, biphenyl derivatives, derivatives of tartaric acid, and optically active glycols, and a C—C bond in the case where $V^1$ or $V^2$ is a cholesterol residue.

Component (B) can, for example, be selected from one or more of (2-[4-(acryloyloxy)-benzoyl]-5-(4-methoxybenzoyl)-isosorbide), (di-2,5-[4-(acryloloxy)-benzoyl]-isosorbide), and (di-2,5 [(4'-acryloyloxy)-benzoyl]-isomannide).

The precursor composition for making the CLCP layer or pattern according to the present invention preferably comprises a mixture of (i) one or more nematic compounds A and (ii) one or more cholesteric (i.e., chiral dopant) compounds B (including cholesterol) which are capable of giving rise to a cholesteric state of the composition. The pitch of the obtainable cholesteric state depends on the relative ratio of the nematic and the cholesteric compounds. Typically, the (total) concentration of the one or more nematic compounds A in the chiral liquid crystal precursor composition for use in the present invention will be four to thirty times the (total) concentration of the one or more cholesteric compounds B. Generally, a precursor composition with a high concentration of cholesteric compounds is not desirable (although possible in many cases) because the one or more cholesteric compounds tend to crystallize, thereby making it impossible to obtain the desired liquid crystal state having specific optical properties.

Nematic compounds A which are suitable for use in the chiral liquid crystal precursor composition for use in the present invention are known in the art; when used alone (i.e., without cholesteric compounds) they arrange themselves in a state characterized by its birefringence. Non-limiting examples of nematic compounds A which are suitable for use in the present invention are described in, e.g., WO 93/22397, WO 95/22586, EP-B-0 847 432, U.S. Pat. No. 6,589,445, US 2007/0224341 A1 and JP 2009-300662 A. The entire disclosures of these documents are incorporated by reference herein.

A preferred class of nematic compounds for use in the present invention comprises one or more (e.g., 1, 2 or 3) polymerizable groups, identical or different from each other, per molecule. Examples of polymerizable groups include groups which are capable of taking part in a free radical polymerization and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the present invention further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formulae (i) to (iii) which are indicated above as meanings for $A_1$ and $A_2$ in formula (I) (and formulae (IA) and (IB)), typically bonded to optionally substituted phenyl groups. Non-limiting specific examples of nematic compounds which are suitable for use in the present invention include 2-methoxybenzene-1,4-diyl bis[4-({[4-(acryloyloxy)butoxy]carbonyl}oxy)benzoate];
4-{[4-({[4-(acryloyloxy)butoxy]carbonyl}oxy)benzoyl]oxy}-2-methoxyphenyl 4-({[4-(acryloyloxy)butoxy]carbonyl}oxy)-2-methylbenzoate;
2-methoxybenzene-1,4-diyl bis[4-({[4-(acryloyloxy)butoxy]carbonyl}oxy)-2-methyl-benzoate];
2-methylbenzene-1,4-diyl bis[4-({[4-(acryloyloxy)butoxy]carbonyl}oxy)-2-methyl-benzoate];
4-{[4-({[4-(acryloyloxy)butoxy]carbonyl}oxy)benzoyl]oxy}-2-methylphenyl 4-({[4-(acryloyloxy)butoxy]carbonyl}oxy)-3-methoxybenzoate;
2-methylbenzene-1,4-diyl bis[4-({[4-(acryloyloxy)butoxy]carbonyl}oxy)benzoate];
2-methylbenzene-1,4-diyl bis[4-({[4-(acryloyloxy)butoxy]carbonyl}oxy)-3-methoxy-benzoate];
4-{[4-({[4-(acryloyloxy)butoxy]carbonyl}oxy)-3-methoxy-benzoyl]oxy}-2-methylphenyl 4-({[4-(acryloyloxy)butoxy]carbonyl}oxy)-3,5-dimethoxybenzoate;
2-methylbenzene-1,4-diyl bis[4-({[4-(acryloyloxy)butoxy]carbonyl}oxy)-3,5-dimethoxy-benzoate];
2-methoxybenzene-1,4-diyl bis[4-({[4-(acryloyloxy)butoxy]carbonyl}oxy)-3,5-di-methoxybenzoate];
4-{[4-({[4-(acryloyloxy)butoxy]carbonyl}oxy)-3-methoxy-benzoyl]oxy}-2-methoxyphenyl 4-({[4-(acryloyloxy)butoxy]carbonyl}oxy)-3,5-dimethoxybenzoate;
4-({4-[4-(acryloyloxy)butoxy]benzoyl}oxy)-3-methylphenyl 4-[4-(acryloyloxy)butoxy]-2-methylbenzoate;
4-({4-[4-(acryloyloxy)butoxy]benzoyl}oxy)-3-methylphenyl 4-[4-(acryloyloxy)butoxy]-3-methylbenzoate;
2-methylbenzene-1,4-diyl bis{4-[4-(acryloyloxy)butoxy]-2-methylbenzoate};
4-({4-[4-(acryloyloxy)butoxy]-2-methylbenzoyl}oxy)-3-methylphenyl 4-[4-(acryloyl-oxy)butoxy]-2,5-dimethylbenzoate;
2-methylbenzene-1,4-diyl bis{4-[4-(acryloyloxy)butoxy]-2,5-dimethylbenzoate}
2-methylbenzene-1,4-diyl bis{4-[4-(acryloyloxy)butoxy]benzoate};
4-({4-[4-(acryloyloxy)butoxy]-3,5-dimethylbenzoyl}oxy)-3-methylphenyl 4-[4-(acryloyloxy)butoxy]-2,5-dimethylbenzoate;
2-methylbenzene-1,4-diyl bis{4-[4-(acryloyloxy)butoxy]-3,5-dimethylbenzoate};
2-methoxybenzene-1,4-diyl bis{4-[4-(acryloyloxy)butoxy]-3,5-dimethylbenzoate};
4-({4-[4-(acryloyloxy)butoxy]-3-methylbenzoyl}oxy)-2-methoxyphenyl 4-[4-(acryloyl-oxy)butoxy]-3,5-dimethylbenzoate;
2-methoxybenzene-1,4-diyl bis{4-[4-(acryloyloxy)butoxy]-3-methylbenzoate};
4-({4-[4-(acryloyloxy)butoxy]benzoyl}oxy)-3-methoxyphenyl 4-[4-(acryloyloxy)-butoxy]-3-methylbenzoate;
4-({4-[4-(acryloyloxy)butoxy]benzoyl}oxy)-3-methoxyphenyl 4-[4-(acryloyloxy)-butoxy]-2,5-dimethylbenzoate;
2-methoxybenzene-1,4-diyl bis{4-[4-(acryloyloxy)butoxy]-2-methoxybenzoate};
2-methoxybenzene-1,4-diyl bis{4-[4-(acryloyloxy)butoxy]-3,5-dimethoxybenzoate};
2-methoxybenzene-1,4-diyl bis{4-[4-(acryloyloxy)butoxy]-3-methoxybenzoate};
2-ethoxybenzene-1,4-diyl bis{4-[4-(acryloyloxy)butoxy]benzoate};
2-ethoxybenzene-1,4-diyl bis{4-[4-(acryloyloxy)butoxy]-2-methylbenzoate};
2-(propan-2-yloxy)benzene-1,4-diyl bis{4-[4-(acryloyloxy)butoxy]benzoate};
4-({4-[4-(acryloyloxy)butoxy]benzoyl}oxy)-2-(propan-2-yloxy)phenyl 4-[4-(acryloyl-oxy)butoxy]-2-methylbenzoate;
2-(propan-2-yloxy)benzene-1,4-diyl bis{4-[4-(acryloyloxy)butoxy]-2-methylbenzoate};
2-(propan-2-yloxy)benzene-1,4-diyl bis{4-[4-(acryloyloxy)butoxy]-2,5-dimethyl-benzoate};
2-(propan-2-yloxy)benzene-1,4-diyl bis{4-[4-(acryloyloxy)butoxy]-3,5-dimethyl-benzoate}; and
2-(propan-2-yloxy)benzene-1,4-diyl bis{4-[4-(acryloyloxy)butoxy]-3,5-dimethoxy-benzoate}.

The one or more cholesteric (i.e., chiral dopant) compounds B for use in the present invention preferably comprise at least one polymerizable group.

Suitable examples of the one or more chiral dopant compounds B include those of formula (I):

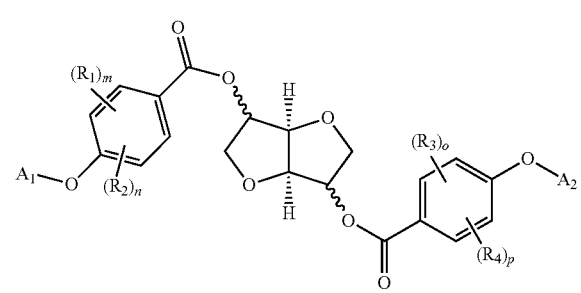

(I)

wherein:
$R_1, R_2, R_3, R_4, R_5, R_6, R_7$ and $R_8$ each independently denote $C_1$-$C_6$ alkyl and $C_1$-$C_6$ alkoxy;

$A_1$ and $A_2$ each independently denote a group of formula (i) to (iii):

—[(CH$_2$)$y$-O]$_z$—C(O)—CH=CH$_2$;  (i)

—C(O)-D$_1$-O—[(CH$_2$)$_y$—O]$_z$—C(O)—CH=CH$_2$;  (ii)

—C(O)-D$_2$-O—[(CH$_2$)$_y$—O]$_z$—C(O)—CH=CH$_2$;  (iii)

$D_1$ denotes a group of formula

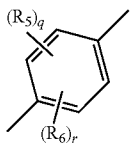

$D_2$ denotes a group of formula

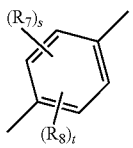

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment, the one or more chiral dopant compounds B may comprise one or more isomannide derivatives of formula (IA):

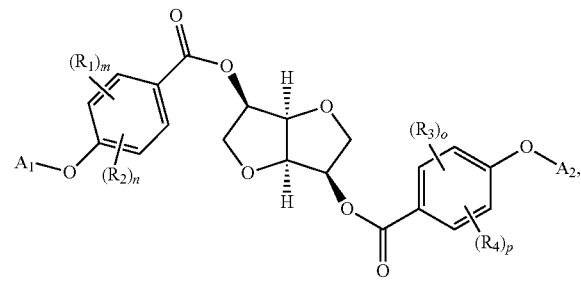
(IA)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

—[(CH$_2$)$y$-O]z-C(O)—CH=CH$_2$;  (i)

—C(O)-D$_1$-O—[(CH$_2$)$y$-O]z-C(O)—CH=CH$_2$;  (ii)

—C(O)-D$_2$-O—[(CH$_2$)$y$-O]z-C(O)—CH=CH$_2$;  (iii)

$D_1$ denotes a group of formula

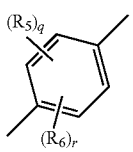

$D_2$ denotes a group of formula

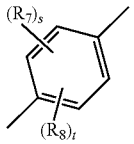

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formula (IA) (and of compounds of formula (I)), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IA) (and in formula (I)) each independently denote $C_1$-$C_6$ alkoxy.

In another embodiment of the compounds of formula (I) and of formula (IA), $A_1$ and $A_2$ each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula —C(O)-D$_1$-O—[(CH$_2$)$_y$—O]$_z$—C(O)—CH=CH$_2$ and/or of formula —C(O)-D$_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula —C(O)-D$_1$-O-[(CH$_2$)$_y$—O]z-C(O)—CH=CH$_2$ and/or a group of formula —C(O)-D$_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkoxy.

In another embodiment, the one or more chiral dopant compounds B may comprise one or more isosorbide derivatives represented by formula (IB):

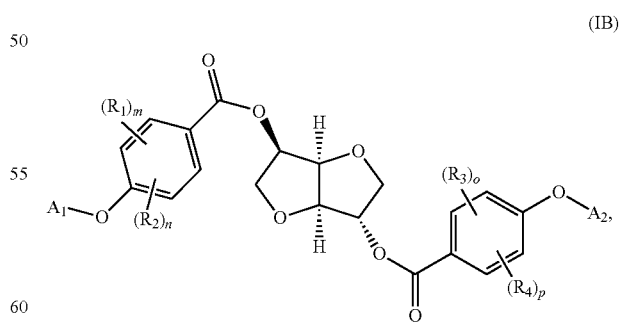
(IB)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

—[(CH$_2$)$_y$-O]$_z$-C(O)—CH=CH$_2$;  (i)

—C(O)-D$_1$-O—[(CH$_2$)$_y$-O]$_z$-C(O)—CH=CH$_2$;  (ii)

—C(O)-D$_2$-O—[(CH$_2$)$_y$-O]$_z$-C(O)—CH=CH$_2$;  (iii)

D$_1$ denotes a group of formula

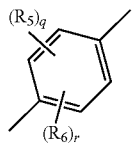

D$_2$ denotes a group of formula

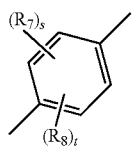

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formula (IB), R$_1$, R$_2$, R$_3$, R$_4$, R$_5$, R$_6$, R$_7$ and R$_8$ each independently denote C$_1$-C$_6$ alkyl. In an alternative embodiment, R$_1$, R$_2$, R$_3$, R$_4$, R$_5$, R$_6$, R$_7$ and R$_8$ in formula (IB) each independently denote C$_1$-C$_6$ alkoxy.

In another embodiment of the compounds of formula (IB), A$_1$ and A$_2$ each independently denote a group of formula —[(CH$_2$)$_y$—O]$_z$—C(O)—CH=CH$_2$; R$_1$, R$_2$, R$_3$ and R$_4$ each independently denote C$_1$-C$_6$ alkyl; and m, n, o, and p each independently denote 0, 1, or 2. In yet another embodiment, A$_1$ and A$_2$ in formula (IB) each independently denote a group of formula —[(CH$_2$)$_y$—O]$_z$—C(O)—CH=CH$_2$; R$_1$, R$_2$, R$_3$ and R$_4$ each independently denote C$_1$-C$_6$ alkoxy; and m, n, o, and p each independently denote 0, 1, or 2.

In another embodiment of the compounds of formula (IB), A$_1$ and A$_2$ each independently denote a group of formula —C(O)-D$_1$-O—[(CH$_2$)$_y$—O]$_z$—C(O)—CH=CH$_2$ and/or of formula —C(O)-D$_2$-O—[(CH$_2$)$_y$—O]$_z$—C(O)—CH=CH$_2$; and R$_1$, R$_2$, R$_3$, R$_4$, R$_5$, R$_6$, R$_7$ and R$_8$ each independently denote C$_1$-C$_6$ alkyl. In an alternative embodiment, A$_1$ and A$_2$ in formula (IB) each independently denote a group of formula —C(O)-D$_1$-O—[(CH$_2$)$_y$—O]$_z$—C(O)—CH=CH$_2$ and/or a group of formula —C(O)-D$_2$-O—[(CH$_2$)$_y$—O]$_z$—C(O)—CH=CH$_2$; and R$_1$, R$_2$, R$_3$, R$_4$, R$_5$, R$_6$, R$_7$ and R$_8$ each independently denote C$_1$-C$_6$ alkoxy.

In a preferred embodiment, the alkyl and alkoxy groups of R$_1$, R$_2$, R$_3$, R$_4$, R$_5$, R$_6$, R$_7$ and R$_8$ in formulae (I), (IA) and (IB) may comprise 3, 4, 6 or 7 carbon atoms and in particular, 4 or 6 carbon atoms.

Examples of alkyl groups comprising 3 or 4 carbon atoms include isopropyl and butyl. Examples of alkyl groups comprising 6 or 7 carbon atoms include hexyl, 2-methylpentyl, 3-methylpentyl, 2,2-dimethylpentyl, and 2,3-dimethylpentyl.

Examples of alkoxy groups comprising 3 or 4 carbon atoms include isopropoxy, but-1-oxy, but-2-oxy, and tert-butoxy. Examples of alkoxy groups comprising 6 or 7 carbon atoms include hex-1-oxy, hex-2-oxy, hex-3-oxy, 2-methylpent-1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylpent-1-oxy, 2,2-dimethylpent-3-oxy, 2,2-dimethylpent-4-oxy, 4,4-dimethylpent-1-oxy, 2,3-dimethylpent-1-oxy, 2,3-dimethylpent-2-oxy, 2,3-dimethylpent-3-oxy, 2,3-dimethylpent-4-oxy, and 3,4-dimethylpent-1-oxy.

Non-limiting specific examples of chiral dopant compounds B of formula (I) which are suitable for use in the present invention include (3R,3aR,6R,6aR)-hexahydrofuro[3,2-b]furan-3,6-diylbis(4-(4-(acryloyloxy)-3-methoxybenzoyloxy)-3-methoxybenzoate);

(3R,3aR,6R,6aR)-6-(4-(4-(acryloyloxy)-3-methoxybenzoyloxy)-3-methoxybenzoyloxy)-hexahydrofuro[3,2-b]furan-3-yl 4-(4-(acryloyloxy)benzoyloxy)-3-methoxybenzoate;

(3R,3aR,6R,6aR)-hexahydrofuro[3,2-b]furan-3,6-diyl bis(4-(4(acryloyloxy)benzoyloxy)-benzoate);

(3R,3aR,6R,6aR)-hexahydrofuro[3,2-b]furan-3,6-diyl bis(4-(4-(acryloyloxy)butoxy)-benzoate);

(3R,3aR,6R,6aR)-hexahydrofuro[3,2-b]furan-3,6-diyl bis(4-(acryloyloxy)-2-methyl-benzoate);

(3R,3aR,6S,6aR)-hexahydrofuro[3,2-b]furan-3,6-diyl bis(4-(4-(acryloyloxy)benzoyloxy)-3-methoxybenzoate);

(3R,3aR,6R,6aR)-hexahydrofuro[3,2-b]furan-3,6-diylbis(4-(4-(acryloyloxy)-3-methoxy-benzoyloxy)benzoate);

(3R,3aR,6R,6aR)-hexahydrofuro[3,2-b]furan-3,6-diylbis(4-(4(acryloyloxy)benzoyloxy)-3-methoxybenzoate);

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-mannitol;

2,5-bis-O-(4-{[4-(acryloyloxy)benzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-mannitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol 2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-mannitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-mannitol;

2,5-bis-O-(4-{[4-(acryloyloxy)benzoyl]oxy}-3-methoxy-benzoyl)-1,4:3,6-dianhydro-D-mannitol;
2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-mannitol;
2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-mannitol;
2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-mannitol;
2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-mannitol;
2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-mannitol;
2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-mannitol;
2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-mannitol;
2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-mannitol;
2,5-bis-O-(4-{[4-(acryloyloxy)-2,5-dimethylbenzoyl]oxy}-2-ethoxybenzoyl)-1,4:3,6-dianhydro-D-mannitol;
2,5-bis-O-(4-{[4-(acryloyloxy)-2-ethoxybenzoyl]oxy}-2-ethoxybenzoyl)-1,4:3,6-dianhydro-D-mannitol;
2,5-bis-O-(4-{[4-(acryloyloxy)-2-methoxybenzoyl]oxy}-2-ethoxybenzoyl)-1,4:3,6-dianhydro-D-mannitol;
2,5-bis-O-(4-{[4-(acryloyloxy)-2-ethoxybenzoyl]oxy}-2-methoxybenzoyl)-1,4:3,6-dianhydro-D-mannitol;
2,5-bis-O-(4-{[4-(acryloyloxy)-2-ethoxybenzoyl]oxy}-3-methylbenzoyl)-1,4:3,6-dianhydro-D-mannitol;
2,5-bis-O-(4-{[4-(acryloyloxy)-2-ethoxybenzoyl]oxy}-3-methoxybenzoyl)-1,4:3,6-dianhydro-D-mannitol;
2,5-bis-O-(4-{[4-(acryloyloxy)-3-methoxybenzoyl]oxy}-3-methoxybenzoyl)-1,4:3,6-dianhydro-D-mannitol;
2,5-bis-O-(4-{[4-(acryloyloxy)-3-methoxybenzoyl]oxy}-3-methylbenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-glucitol;
2,5-bis-O-(4-{[4-(acryloyloxy)benzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-glucitol;
2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2,5-bis-O-(4-{[4-(acryloyloxy)benzoyl]oxy}-3-methoxybenzoyl)-1,4:3,6-dianhydro-D-glucitol;
2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-glucitol;
2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-glucitol;
2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-glucitol;
2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-glucitol;
2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-glucitol;
2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-glucitol;
2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-glucitol;
2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-glucitol
2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-glucitol;
2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-glucitol
2,5-bis-O-(4-{[4-(acryloyloxy)-2,5-dimethylbenzoyl]oxy}-2-ethoxybenzoyl)-1,4:3,6-dianhydro-D-glucitol;
2,5-bis-O-(4-{[4-(acryloyloxy)-2-ethoxybenzoyl]oxy}-2-ethoxybenzoyl)-1,4:3,6-dianhydro-D-glucitol;
2,5-bis-O-(4-{[4-(acryloyloxy)-2-methoxybenzoyl]oxy}-2-ethoxybenzoyl)-1,4:3,6-dianhydro-D-glucitol;
2,5-bis-O-(4-{[4-(acryloyloxy)-2-ethoxybenzoyl]oxy}-2-methoxybenzoyl)-1,4:3,6-dianhydro-D-glucitol;
2,5-bis-O-(4-{[4-(acryloyloxy)-2-ethoxybenzoyl]oxy}-3-methylbenzoyl)-1,4:3,6-dianhydro-D-glucitol; and
2,5-bis-O-(4-{[4-(acryloyloxy)-2-ethoxybenzoyl]oxy}-3-methoxybenzoyl)-1,4:3,6-dianhydro-D-glucitol.

The one or more chiral dopant compounds B will usually be present in a total concentration of from 0.1% to 30% by weight, e.g., from 0.1% to 25%, or from 0.1% to 20% by weight, based on the total weight of the composition. The best results will often be obtained with concentrations of from 3% to 10% by weight, e.g., from 5% to 8% by weight, based on the total weight of the precursor composition. The one or more nematic compounds A will often be present in a concentration of from 30% to 50% by weight, based on the total weight of the precursor composition.

The CLCP precursor composition for use in the present invention can be applied to the surface of a substrate by any suitable method such as, for example, by spray coating, knife coating, roller coating, screen coating, curtain coating, gravure printing, flexography, offset printing, dry offset printing, letterpress printing, screen-printing, pad printing, and ink-jet printing (for example, continuous ink-jet printing, drop-on-demand ink-jet printing, or valve-jet printing). As stated above, the method of applying the precursor composition onto a substrate is one of the parameters that may be used to control the mean diameter and/or the density of the randomly distributed craters present in the CLCP layer or pattern.

In preferred embodiments, flexography printing or ink-jet printing techniques can be used for applying the CLCP precursor composition. The industrial ink-jet printers, commonly used for numbering, coding and marking applications on conditioning lines and printing presses, are particularly suitable. Preferred ink-jet printers include single nozzle continuous ink-jet printers (also called raster or multi-level deflected printers) and drop-on-demand ink-jet printers, in particular valve-jet printers. The thickness of the applied precursor composition, after curing, according to the above described application techniques, will usually be at least 1 µm, e.g., at least 3 µm, or at least 4 µm, and will usually be not more than 20 µm, e.g., not more than 15 µm, not more than 12 µm, not more than 10 µm, or not more than about 5 µm.

The CLCP precursor composition will usually comprise a solvent to adjust its viscosity to a value which is suitable for the employed application (e.g., printing) technique. For example, typical viscosity values for ink-jet printing inks are in the range of from about 4 to about 30 mPa·s at 25° C. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, toluene and mixtures of two or more thereof. As set forth above, the viscosity of the CLCP precursor composition also is one of the parameters which can be used to control the density and/or mean diameter of the randomly distributed craters in the CLCP layer or.

If the CLCP precursor composition for use in the present invention is to be cured/polymerized by UV radiation the composition will also comprise at least one photoinitiator that shows a non-negligible solubility in the composition. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-1-butanone and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If the precursor composition is to be cured by a method which is different from irradiation with UV light such as, e.g., by means of high-energy particles (e.g., electron beams), X-rays, gamma-rays, etc. the use of a photoinitiator can, of course, be dispensed with.

The CLCP precursor composition for use in the present invention may also comprise a variety of other optional components which are suitable and/or desirable for achieving a particular desired property of the composition and in general, may comprise any components/substances which do not adversely affect a required property of the precursor composition to any significant extent. As set forth above, these optional components and in particular, the types and concentrations thereof can also affect the density and/or mean diameter of the craters in the CLCP layer or pattern. Non-limiting examples of such optional components are surfactants, resins, silane compounds, sensitizers for the photoinitiators (if present), etc. For example, the composition may comprise one or more silane compounds which show a non-negligible solubility in the composition. Non-limiting examples of suitable silane compounds include optionally polymerizable silanes such as those of formula $R_1R_2R_3$—Si—$R_4$ wherein $R_1$, $R_2$, and $R_3$ independently represent alkoxy and alkoxyalkoxy having a total of from 1 to about 6 carbon atoms and $R_4$ represents vinyl, allyl, $(C_{1-10})$alkyl, (meth)acryloxy$(C_{1-6})$alkyl, and glycidyloxy $(C_{1-6})$alkyl such as, e.g., vinyltriethoxysilane, vinyltrimethoxysilane, vinyltris(2-methoxyethoxy)silane, 3-methacryloxypropyl-trimethoxysilane, octyltri-ethoxysilane, and 3-glycidyloxypropyl triethoxysilane from the Dynasylan® family supplied by Evonik Following the application of the precursor composition onto the substrate (and/or the intermediate layer) the precursor composition is brought to a chiral liquid crystal state. To that end the precursor composition will usually be heated, whereby the solvent contained in the composition, if present, is evaporated and the promotion of the chiral liquid crystal state takes place. The temperature used to evaporate the solvent and to promote the formation of the liquid crystal state depends on the components of the precursor composition and will in many cases range from 55° C. to 150° C., e.g., from 55° C. to 100° C., preferably from 60° C. to 100° C. Examples of suitable heating sources include conventional heating means and in particular, radiation sources such as, e.g., an IR lamp. The required heating time depends on several factors such as, e.g., the components of the precursor composition, the type of heating device and the intensity of the heating (energy output of the heating device). In many cases a heating time of from 1 second to 30 seconds such as, e.g., not more than 20 seconds, not more than 10 seconds, or not more than 5 seconds will be sufficient. Once the chiral liquid crystal state has been reached the composition is cured, for example by exposing it to UV radiation (provided a photoinitiator is present in the composition).

In a still further embodiment of the CLCP layer or pattern according to the present invention, the optical (e.g., color-shift) properties of the layer or pattern may have been modified in one or more areas thereof. Examples of methods by which this modification may be accomplished are disclosed in, e.g., WO 2011/069689, WO 2011/069690, WO 2011/069691 and WO 2011/069692, mentioned above, as well as in WO 2012/076533 and WO 2012/076534, the entire disclosures of which are incorporated by reference herein.

Some of the methods which can be used to modify the optical properties of a CLCP layer or pattern according to the present invention will be described in the following.

For example, after the chiral liquid crystal precursor composition has been applied onto at least one surface of a substrate (and/or an intermediate layer) and has been heated to bring it to a chiral liquid crystal state, there may be applied onto the composition in one or more areas thereof at least one modifying composition which modifies the chiral liquid crystal state locally in the one or more areas (optionally upon heating, depending on the type of modifying composition).

More specifically, following the application of the precursor composition and the formation of a chiral liquid crystal state, a (at least one) modifying composition may be applied onto one or more areas of the applied composition in the chiral liquid crystal state. The modifying composition is capable of changing the chiral liquid crystal state (optionally upon heating, depending on the type of modifying composition). The modifying composition may be applied while the CLCP precursor composition is still in a heated state (e.g., immediately following the completion of the heating operation) or may be applied after the chiral liquid crystal precursor composition has cooled down to at least some extent (e.g., is at substantially room temperature).

Depending on its nature, the modifying composition will usually modify the chiral liquid crystal state from a (predominantly or substantially) anisotropic state which is characterized by specific optical (e.g., color-shifting) properties to:
(i) a (predominantly or substantially) isotropic liquid crystal state where the color shifting properties of the liquid crystal state are substantially absent and/or no longer detectable with the unaided human eye, or
(ii) a modified chiral liquid crystal state with at least one optical property that is different from a corresponding optical property of the initial chiral liquid crystal state.

The modifying composition may, for example, be or comprise a modifying agent. The modifying agent will usually comprise one or more aprotic organic compounds which are liquid at room temperature and preferably have a relatively high dipole moment and a relatively high dielectric constant. Non-limiting examples thereof include ketones having from 3 to about 6 carbon atoms, alkyl esters and dialkylamides of carboxylic acids which comprise a total of from 2 to about 6 carbon atoms, dialkyl sulfoxides comprising a total of from 2 to about 4 carbon atoms, and optionally substituted (e.g., alkyl-substituted) nitrobenzene such as, e.g., dimethyl ketone, methyl ethyl ketone, cyclohexanone, ethyl acetate, dimethyl formamide, dimethyl sulfoxide, nitrobenzene, nitrotoluene, and mixtures of two or more thereof. Preferred compounds for use in the modifying agent include acetone, methyl ethyl ketone and ethyl acetate.

A modifying agent for use in modifying the CLCP layer or pattern of the present invention may further comprise one or more resins to adjust its viscosity. Of course, the resin(s) must be compatible with the application (e.g., printing) technique that is to be employed. Non-limiting examples of resins which may be suitable, depending on the particular circumstances, include polyesters resins such as, e.g, DYNAPOL® L 1203, L 205, L 206, L 208, L 210, L 411, L 651, L658, L 850, L 912, L 952, LH 530, LH 538, LH 727, LH 744, LH 773, LH 775, LH 818, LH 820, LH 822, LH 912, LH 952, LH 530, LH 538, LH 727, LH 744, LH 773, LH 775, LH 818, LH 820, LH 822, LH 823, LH 826, LH 828, LH 830, LH 831, LH 832, LH 833, LH 838, LH898, LH 908, LS436, LS615, P1500, S1218, S1227, S1247, S1249, S1252, S1272, S1401, S1402, S1426, S1450, S1510, S1606, S1611, S243, S320, S341, S361, S394, and S EP1408 from Evora. Other suitable resins known to those of skill in the art may be used as well. In a preferred embodiment the one or more resins are selected from DYNAPOL® L 1203, L 205, L 206, L 208, L 210, L 411, L 651, L658, L 850, L 912, L 952, LH 530, LH 538, LH 727, LH 744 from Evonik. A typical concentration range for the one or more resins is from 3% to 15% by weight, based on the total weight of the modifying agent.

When the modifying agent comprises a solvent or a solvent mixture, after the evaporation of the solvent the initial chiral liquid crystal state will locally (in one or more area(s)) switch from a (predominantly or substantially) anisotropic state to a (predominantly or substantially) isotropic state.

In another embodiment the modifying composition may be or comprise a second CLCP precursor composition. The second precursor composition which is applied in one or more areas on the first precursor composition in the initial chiral liquid crystal state may be the same as or different from the first precursor composition. Further, everything that is set forth above with respect to the first precursor composition (e.g., components, application methods, etc.) applies equally and without exception also to the second precursor composition.

If the second precursor composition is different from the first precursor composition the one or more differences may relate to, e.g., one or more of the compounds A and B that are present in these compositions and/or to the concentrations of one or more of these compounds. For example, a or the only difference between these compositions may be that one or more (or all) of the chiral dopant compounds B are present in the second composition in a concentration/concentrations that is/are different from the corresponding concentration/concentrations in the first composition. Further, a or the only difference between the first and second compositions may be that the one or more chiral dopant compounds B in the first composition are of formula (I) above and/or related formulae and at least one of the one or more chiral dopant compounds B in the second composition is different from formula (I) and/or related formulae. For example, at least one of the one or more chiral dopant compounds B in the second composition may be an isosorbide or isomannide derivative as described in, e.g., EP-B-0 847 432, GB-A-2 330 139, and U.S. Pat. No. 6,589,445, the entire disclosures of which are incorporated by reference herein.

After the application (e.g. deposition) of the second precursor composition to one or more areas of the first precursor composition in the initial chiral liquid crystal state having initial optical properties, the second precursor composition is brought to a second chiral liquid crystal state having different optical properties. To that end at least a part of the one or more areas onto which the second precursor composition has been applied is heated, the solvent contained in the composition, if present, is evaporated and the promotion of the desired second chiral liquid crystal state takes place. The temperature used to evaporate the solvent and to promote the formation of the second liquid crystal state depends on the components of the second precursor composition and will in many cases range from 55° C. to 150° C., e.g., from 55° C. to 100° C., preferably from 60° C. to 100° C. Examples of suitable heating sources include conventional heating means and in particular, radiation sources such as, e.g., an IR lamp.

In yet another embodiment, the modifying composition for use in the present invention may be or comprise a chiral dopant composition. The chiral dopant composition preferably comprises one or more (e.g., one, two, three or four) chiral dopant compounds C of formula (I) set forth above and/or related formulae. In a more preferred embodiment the chiral dopant composition comprises at least one chiral dopant compound C and at least one other chiral dopant D which is different from a compound of formula (I) and related formulae. The at least one chiral dopant compound D may be selected, for example, from the derivatives of isosorbides and isomannides which are disclosed in, e.g., EP-B-0 847 432, GB-A-2 330 139, and U.S. Pat. No. 6,589,445, the entire disclosures of which are incorporated by reference herein.

As chiral dopant compounds C which are preferably present in the chiral dopant composition the chiral dopant compounds B set forth above may, for example, be used. Accordingly, everything that is set forth above with respect to compounds B applies equally and without exception also to compounds C. Also, it is to be appreciated that a (or the only) chiral dopant compound C that is present in the chiral dopant composition may be identical to a (or the only) chiral dopant compound B that is present in the chiral liquid crystal precursor composition.

The chiral dopant composition will usually comprise the one or more chiral dopant compounds in a total concentration of from 0.1% to 30% by weight, e.g., from 0.1% to 25%, or from 0.1% to 20% by weight, based on the total weight of the composition. Often, the total concentration will be from 3% to 10% by weight, e.g., from 5% to 8% by weight, based on the total weight of the chiral dopant composition.

The chiral dopant composition will usually comprise a solvent to adjust its viscosity to a value which is suitable for the employed application (e.g., printing) technique. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, toluene and mixtures of two or more thereof.

After the application of the chiral dopant composition to one or more areas of the CLCP precursor composition in the initial chiral liquid crystal state, the one or more areas are brought to a modified chiral liquid crystal state having modified optical properties. To that end the one or more areas onto which the chiral dopant composition has been applied are heated, the solvent contained in the composition, if present, is evaporated and the promotion of the desired modified chiral liquid crystal state takes place. The temperature used to evaporate the solvent and to promote the formation of the modified liquid crystal state depends on, e.g., the components of chiral dopant composition and will in many cases range from 55° C. to 150° C., e.g., from 55° C. to 100° C., preferably from 60° C. to 100° C. Examples of suitable heating sources include conventional heating means and in particular, radiation sources such as, e.g., an IR lamp.

The application of the modifying composition is performed onto one or more areas of the precursor composition in the initial chiral liquid crystal state preferably with a printing technique and in particular, a technique selected from continuous ink-jet printing, drop-on-demand ink-jet printing, valve jet printing and spray coating. In a preferred embodiment ink-jet techniques are used for applying the modifying composition. The industrial ink-jet printers, commonly used for numbering and coding and marking applications on conditioning lines and printing presses, are particularly suitable. Preferred ink-jet printers are single nozzle continuous ink-jet printers (also called raster or multi level deflected printers) and drop-on-demand ink-jet printers, in particular valve-jet printers.

It is, of course, possible to use more than one modifying composition and to apply them simultaneously and/or successively onto the applied (first) precursor composition (e.g., in different areas of the applied first precursor composition).

The CLCP layer or pattern having randomly distributed craters therein according to the present invention is finally obtained by curing and/or polymerizing the precursor composition in the initial chiral liquid crystal state that has been locally modified (in one or more areas) by the application of the modifying composition. The fixing or hardening is preferably performed by irradiation with UV-light, which induces polymerization of the polymerizable groups present in the precursor composition (and optionally in the modifying composition).

Yet another possible method of modifying the optical properties of the CLCP layer or pattern having randomly distributed craters of the present invention in one or more areas thereof (which method can be used alone or in combination with one or more of the methods of modifying the optical properties of a CLCP layer set forth above) involves the use of a salt in the precursor composition, in combination with a layer or pattern of a modifying resin that is in contact with the applied uncured precursor composition in the chiral liquid crystal state (e.g., as the substrate or in the form of an intermediate layer or pattern between the substrate and the layer or pattern of the applied precursor composition).

More specifically, the CLCP precursor composition may comprise at least one salt that changes (usually in a concentration-dependent manner) the position of a selective reflection band ($\lambda_{max}$) exhibited by the composition (in a chiral liquid crystal state) compared to the position of the selective reflection band exhibited by an (otherwise identical) composition that does not contain the at least one salt. Further, the modifying resin in contact with the uncured CLCP layer or pattern changes the position of the selective reflection band exhibited by the cured chiral liquid crystal precursor composition comprising the at least one salt (when in a chiral liquid crystal state) in the one or more areas. The term "modifying resin" as used herein includes cured resins as set forth below, and also includes aqueous resins such as, e.g., polyamide resins (for example, CAS No 175893-71-7, CAS No 303013-12-9, CAS No 393802-62-5, CAS No 122380-38-5, CAS No 9003-39-8), alkyd resins (e.g. of the polyester type), and polyacrylates.

The at least one salt that changes the position of the selective reflection band exhibited by the CLCP may be selected from metal salts and (preferably quaternary) ammonium salts.

For example, the at least one salt may comprise at least one salt of a metal such an alkali or alkaline earth metal (e.g., Li, Na), for example, one or more of lithium perchlorate, lithium nitrate, lithium tetrafluoroborate, lithium bromide, lithium chloride, sodium carbonate, sodium chloride, sodium nitrate, and/or one or more (organically substituted) ammonium salts such as tetraalkylammonium salts, for example, one or more of tetrabutylammonium perchlorate, tetrabutylammonium chloride, tetrabutylammonium tetrafluoroborate, and tetrabutylammonium bromide.

Further, at least one of the one or more polymerizable monomers used for providing a modifying resin for use in the present invention may comprise at least two unsaturated carbon-carbon bonds and/or at least one of the one or more polymerizable monomers may comprise at least one heteroatom, preferably selected from O, N and S and in particular, O and/or N. For example, at least one of the one or more polymerizable monomers used for providing the modifying resin may comprise one or more groups of formula $H_2C=CH—C(O)$— or $H_2C=C(CH_3)—C(O)$—. Non-limiting examples of corresponding monomers include polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, dipropylene glycol diacrylates, hexanediol diacrylates, ethoxylated trimethylol propane triacrylates, and tripropylene glycol diacrylates.

In another embodiment, the modifying resin for changing the position of the selective reflection band exhibited by the salt-containing cured CLCP layer or pattern of the present invention may comprise a radiation-cured resin, for example, a UV-cured resin.

In this regard, it is to be kept in mind that the modifying resin may also serve as a means of modifying the surface tension of the surface of the substrate (by being present between the substrate and the applied precursor composition). Accordingly, the density and/or mean diameter of randomly distributed craters in the CLCP layer or pattern in the one or more areas of the substrate in which the modifying resin is present between the precursor composition and the substrate may be different from the density and/or mean diameter of craters in the CLCP layer or pattern in the one or more areas of the surface of the substrate, if any, in which no modifying resin is present between the precursor composition and the substrate. In other words, in the salt/modifying resin embodiment set forth above the modifying resin may be used not only for changing the color shift properties of the CLCP layer or pattern but also for modifying the average density and/or size of the craters randomly distributed therein, thereby adding to the complexity (and security) of a marking comprising the CLCP layer or pattern.

In another embodiment of the CLCP layer or pattern having randomly distributed craters therein according to the present invention, the layer or pattern may comprise one or more materials having detectable properties that are different from a property of the CLCP itself in order to further strengthen the security provided by the layer or pattern (e.g., in the form of a marking). For example, the one or more materials may include one or more of flakes, fibers, inorganic compounds, organic compounds, dyes, pigments, absorber materials absorbing electromagnetic radiation in the UV and/or visible and/or IR range, luminescent materials, fluorescent materials, phosphorescent materials, colored materials, photochromic materials, thermochromic materials, magnetic materials, and materials having one or more detectable particle size distributions (e.g., having a monomodal or a polymodal size distribution). The one or more materials may be present in the composition for making the layer or pattern in individual concentrations of, e.g., from 0.001% to 1% by weight, based on the total weight of the precursor composition. In one embodiment, a corresponding material may comprise one or more functionalities which allow it to become chemically bonded to the composition for making the layer or pattern.

The one or more luminescent materials, if present, may comprise one or more lanthanide compounds such as, e.g., complexes of lanthanides and β-diketo compounds.

Non-limiting examples of fluorescent materials include VAT dyes, perylene, quaterrylene, qerrylene derivatives, such as those disclosed in US 2011/0293899 A1, the entire disclosure of which is incorporated by reference herein.

Non-limiting examples of pigments that are suitable for use in the present invention include those disclosed in WO 2008/000755, the entire disclosure of which is incorporated by reference herein.

Further non-limiting examples of the one or more materials having detectable properties that are different from the detectable properties of the CLCP layer or pattern of the present invention itself include salts/complexes of the rare earth metals (scandium, yttrium and the lanthanides such as Ce, Pr, Nd, Sm, Eu, Gd, Tb, Dy, Ho, Er, Tm, and Yb) and the actinides.

Non-limiting examples of these salts and complexes are disclosed in US 2010/0307376 A1, the entire disclosure of which is incorporated by reference herein in its entirety, such as, e.g., the luminescent lanthanide complexes of the formula:

$M_3[Ln(A)_3]$ wherein

M represents $Li^+$, $Na^+$, $K^+$, $Rb^+$, and $Cs^+$, and combinations thereof;

Ln represents a trivalent rare-earth cation of Ce, Pr, Nd, Sm, Eu, Gd, Tb, Dy, Ho, Er, Tm, and Yb, and combinations thereof; and A represents a dinegatively charged, tridentate 5- or 6-membered heteroaryl ligand bearing at least one carboxylic group and optionally being substituted by one or more of hydroxy, amino, $C_1$-$C_6$ alkoxy (e.g., methoxy, ethoxy, isopropoxy, etc.) $C_1$-$C_6$ alkyl (e.g., methyl, ethyl, isopropyl, etc.). The 5- or 6-membered heteroaryl group is selected from, e.g., pyridine, imidazole, triazole, pyrazole, and pyrazine.

Preferably A represents a ligand selected from dipicolinic acid, 4-hydroxypyridine-2,6-dicarboxylic acid, 4-amino-2,6-pyridinecarboxylic acid, 4-ethoxypyridine-2,6-dicarboxylic acid, 4-isopropoxypyridine-2,6-dicarboxylic acid and/or 4-methoxypyridine-2,6-dicarboxylic acid and/or Ln is chosen from $Eu^{3+}$, $Yb^{3+}$ and/or $Tb^{3+}$.

Non-limiting examples of IR absorber materials for use in the present invention include those disclosed in WO2007/060133, the entire disclosure of which is incorporated by reference herein. Non-limiting examples of specific materials include copper(II) fluoride ($CuF_2$), copper hydroxyfluoride (CuFOH), copper hydroxide ($Cu(OH)_2$), copper phosphate hydrate ($Cu_3(PO_4)_2$*$2H_2O$), anhydrous copper phosphate ($Cu_3(PO_4)_2$), basic copper(II) phosphates (e.g. $Cu_2PO_4(OH)$, "Libethenite" whose formula is sometimes written as $Cu_3(PO_4)$ $2*Cu(OH)_2$; $Cu_3(PO_4)(OH)_3$, "Cornetite", $Cu_5(PO_4)_3(OH)_4$, "Pseudomalachite", $CuAl_6(PO_4)_4$ $(OH)_8.5H_2O$ "Turquoise", etc.), copper (II) pyrophosphate ($Cu_2(P_2O_7)*3H_2O$), anhydrous copper(II) pyrophosphate ($Cu_2(P_2O_7)$), copper(II) metaphosphate ($Cu(PO_3)_2$), more correctly written as $Cu_3(P_3O_9)_2$), iron(II) fluoride ($FeF_2*4H_2O$), anhydrous iron(II) fluoride ($FeF_2$), iron(II) phosphate ($Fe_3(PO_4)_2*8H_2O$, "Vivianite"), lithium iron(II) phosphate ($LiFePO_4$, "Triphylite"), sodium iron(II) phosphate ($NaFePO_4$, "Maricite"), iron(II) silicates ($Fe_2SiO_4$, "Fayalite"; $FexMg_2xSiO_4$, "Olivine"), iron(II) carbonate ($FeCO_3$, "Ankerite", "Siderite"); nickel(II) phosphate ($Ni_3(PO_4)_2*8H_2O$), and titanium(III) metaphosphate ($Ti(P_3O_9)$). Moreover, a crystalline IR absorber may also be a mixed ionic compound, i.e., where two or more cations are participating in the crystal structure, as e.g. in $Ca_2Fe(PO_4)_2*4H_2O$, "Anapaite". Similarly, two or more anions can participate in the structure as in the mentioned basic copper phosphates, where $OH^-$ is the second anion, or even both together, as in magnesium iron phosphate fluoride, $MgFe(PO_4)F$, "Wagnerite". Additional non-limiting examples of materials for use in the present invention are disclosed in WO 2008/128714 A1, the entire disclosure of which is incorporated by reference herein.

The one or more magnetic materials (including soft magnetic materials and hard magnetic materials) for (optional) use in the present invention may comprise at least one material selected from ferromagnetic materials, ferrimagnetic materials, paramagnetic materials, and diamagnetic materials. For example, the one or more magnetic materials may comprise at least one material selected from metals and metal alloys comprising at least one of iron, cobalt, nickel, and gadolinium. Further, the magnetic material may comprise, without limitation, an alloy of iron, cobalt, aluminum, and nickel (with or without copper, niobium and/or tantalum), such as Alnico, or an alloy of titanium, nickel, cobalt, aluminum, and iron, such as Ticonal; and ceramics. The one or more magnetic materials may also comprise at least one material selected from inorganic oxide compounds such as maghemite and/or hematite, ferrites of formula $MFe_2O_4$ wherein M represents Mg, Mn, Co, Fe, Ni, Cu or Zn, and garnets of formula $A_3B_5O_{12}$ wherein A represents La, Ce, Pr, Nd, Sm, Eu, Gd, Tb, Dy, Ho, Er, Tm, Yb, Lu or Bi and B represents Fe, Al, Ga, Ti, V, Cr, Mn or Co.

The one or more materials may be substantially invisible under light inside the visible spectrum but visible under light outside the visible spectrum, such as UV or IR light. Of course, the material must also be compatible with the liquid crystal polymer.

Further non-limiting examples of the one or more materials having detectable properties that are different from a property of the CLCP layer or pattern of the present invention itself include multilayer particles or flakes such as those disclosed in U.S. provisional Application No. 61/616,133, filed Mar. 27, 2012, the entire disclosure of which is incorporated by reference herein. The multilayer flakes disclosed in this document comprise at least two chiral liquid crystal polymer (CLCP) layers comprising a first CLCP layer that has a first detectable parameter and a second CLCP layer including a second detectable parameter, and at least one additional layer including a third detectable parameter, the at least one additional layer comprising a material that is not a chiral liquid crystal polymer. The third detectable parameter is different from each of the first detectable parameter and the second detectable parameter.

If one or more materials having detectable properties that are different from a property of the CLCP layer or pattern according to the present invention itself are present in the layer or pattern in the form of particles and/or flakes, they may be randomly distributed in the CLCP precursor composition and may thus, be randomly distributed in the final cured CLCP layer or pattern according to the present invention. In combination with suitable detection methods for the detectable properties of the one or more materials, this random distribution of particles/flakes can be exploited as an additional means for identifying/authenticating/tracking an article/item that is provided with a marking comprising a CLCP layer or pattern according to the present invention (i.e., in addition to the density and/or mean diameter of the randomly distributed craters and the (optionally modified) optical properties of the CLCP layer or pattern itself). This will improve the security provided by a corresponding marking even further.

Further and as set forth above, at least one intermediate layer or pattern may be present between the substrate and the CLCP layer or pattern in at least a part of the surface of the substrate that has thereon the CLCP layer or pattern or a part thereof. The at least one intermediate layer or pattern may comprise, for example, a varnish and in particular and preferably, a UV-cured varnish. The varnish preferably is transparent for IR radiation. Varnishes which are suitable for this purpose are known to those skilled in the art and include the modifying resins which are set forth above in connection with the modification of the optical properties of the cured CLCP layer or pattern where the corresponding precursor composition comprises a suitable salt. A specific, non-limiting example of a suitable varnish is set forth in the Examples below.

The at least one intermediate layer or pattern (e.g., the UV-cured varnish) may comprise one or more materials having detectable properties which are different from a property of the CLCP layer or pattern according to the present invention. The one or more materials may include, for example one or more of flakes, fibers, inorganic compounds, organic compounds, dyes, pigments, absorber materials absorbing electromagnetic radiation in the UV and/or visible and/or IR range, luminescent materials, fluorescent materials, phosphorescent materials, colored materials, photochromic materials, thermochromic materials, magnetic materials, and materials having one or more detectable particle size distributions (e.g., a monomodal or a polymodal size distribution). Examples of corresponding materials which are suitable for this purpose include the materials which are set forth above as examples of the one or more materials which may be present in the CLCP layer or pattern according to the present invention itself. Further, if a material is present in the intermediate layer or pattern in particulate form it may be randomly distributed in the intermediate layer or pattern and may thus, also be used for identification/authentification/tracking purposes (in addition to the density and/or mean diameter of the randomly distributed craters and the (optionally modified) optical properties of the CLCP layer or pattern according to the present invention itself and the one or more materials which may optionally be present in this layer or pattern, as set forth above).

The at least one surface of the substrate and/or the at least one intermediate layer or pattern which carries the CLCP layer or pattern according to the present invention (or at least a part thereof) may optionally comprise one or more areas having a design that is within a perimeter of a crater comprised in the CLCP layer or pattern. The design may have a surface area that is smaller than an area of an opening of a crater, whereby the design is at least partially exposed by (and visible or at least detectable through) the opening. Alternatively, the design may cover the entire or substantially the entire surface or at least a major part (e.g., at least 50%) of the surface of the substrate and/or the at least one intermediate layer that carries the CLCP layer or pattern of the present invention, and the design may be fully or partially exposed by (and visible or at least detectable through) an opening of at least one of the craters. Non-limiting examples of designs which are suitable for this purpose include microdots, microtaggants, micromarkings, and micro alphanumeric characters. These designs preferably have at least one dimension that is smaller than the opening of one or more or all of the craters. Further non-limiting examples of types of designs which are suitable for use in the present invention include clouds of dots. The clouds of dots may be in the form of, for example, distributions of particles or flakes where the particles or flakes are randomly distributed or their distribution is determined by a mathematical algorithm. They may be printed with a very high resolution that renders them difficult to reproduce. Another type of cloud of dots that is suitable for use in the present invention is represented by sums of glyphs which represent a code having a unique auto-ID. The glyphs can take arbitrary shapes and forms. For example, the glyphs may be in the form of micro 45° diagonal lines (preferably invisible to the unaided eye) and their orientation in one the other direction may correspond to 0 or 1 in a binary code, whereby a sum of glyphs which individually are oriented in a specific manner can represent a specific code and can provide data or information. Yet another non-limiting type of cloud of dots is represented by tags on a surface having an optically readable pattern. Each tag has a background pattern that defines a discrete area. The background pattern is common to all tags. Each tag further has coded data positioned within the discrete areas. The coded data is represented by a plurality of optically readable marks positioned according to an encoding scheme. The background pattern is distinguishable from the coded data. The types of designs set forth above can be printed with, for example, a common carbon black ink or an IR transparent black ink or an invisible ink with a ☐max or a ☐max range of a specific absorption or emission wavelength. Corresponding inks are known to those of skill in the art of printing techniques using visible or invisible inks The at least one surface of the substrate and/or the at least one intermediate layer or pattern which carries the CLCP layer or pattern according to the present invention (or at least a part thereof) also may include an area that has varying (non-uniform) optical properties across its surface. The varying optical properties may include, for example, color variations and/or pattern variations.

In one embodiment, the at least one intermediate layer or pattern may comprise in at least a part thereof a CLCP material in the form of a layer or pattern that has an optical (e.g., spectral) property which is different from a corresponding optical property of the CLCP layer or pattern according to the present invention. For example, the intermediate layer or pattern or at least a part thereof which carries the CLCP layer or pattern or a part thereof may be a CLCP layer or pattern that is of the same type as the CLCP layer or pattern but differs from the latter with respect to a spectral property thereof. For example, it may differ from the CLCP layer or pattern by having been obtained from different nematic and/or cholesteric compounds or by using the same compounds in a different weight ratio. It further may differ from the CLCP layer or pattern by comprising a salt that changes the position of a selective reflection band ($\lambda_{max}$) exhibited by the CLCP layer or pattern, as set forth in, e.g. WO 2012/076533. The at least one different optical property of a corresponding intermediate layer or pattern would be detectable (and in some cases visible with the unaided human eye) in areas thereof which are exposed by the randomly distributed craters in the CLCP layer or pattern. For example, some of these randomly distributed craters may expose areas with a different spectral property (including, e.g., circular reflected polarized light, position of at least one spectral reflection band, visibility with the unaided eye, etc.) and some of the craters may be positioned above an area where no intermediate CLCP layer or pattern is present. This can add to the complexity and security of a corresponding marking.

As set forth above, at least one top layer or pattern which may be transparent or non-transparent for radiation in the visible range may be present on at least a part of the CLCP layer or pattern. Suitable materials for making the top layer or pattern include those which are set forth above as suitable materials for forming an intermediate layer or pattern. Further, as in the case of the optionally present intermediate layer or pattern between the substrate and the CLCP layer or pattern, the top layer or pattern may itself be a CLCP layer or pattern that has at least one optical property which is different from a corresponding optical property of the CLCP layer or pattern (by optical properties it is meant the position of a selective reflection band $\lambda_{max}$, or the polarization (right or left handed) of the CLCP). Of course, the top layer or pattern must not prevent the determination of the density and/or mean diameter of the craters in the CLCP layer or pattern. For example, the top layer or pattern or at least a part thereof may be a CLCP layer or pattern that is of the same type as the CLCP layer or pattern but differs from the latter with respect to a spectral property thereof. For example, it may differ from the CLCP layer or pattern by having been obtained from different nematic and/or cholesteric compounds or by using the same compounds in a different weight ratio. It further may differ from the CLCP layer or pattern by comprising a salt that changes the position of a selective reflection band ($\lambda_{max}$) exhibited by the CLCP layer or pattern, as set forth in, e.g. WO 2012/076533.[0132] [0133] Further, as also in the case of an optionally present intermediate layer or pattern between the substrate and the CLCP layer or pattern, the top layer or pattern may comprise one or more materials having detectable properties which are different from a property of the CLCP layer or pattern. The one or more materials may include, for example, one or more of flakes, fibers, inorganic compounds, organic compounds, dyes, pigments, absorber materials absorbing electromagnetic radiation in the UV and/or visible and/or IR range, luminescent materials, fluorescent materials, phosphorescent materials, colored materials, photochromic materials, thermochromic materials, magnetic materials, and materials having one or more detectable particle size distributions (e.g., monomodal or polymodal). Examples of corresponding materials which are suitable for this purpose include the materials which are set forth above as examples of the one or more materials which may be present in the CLCP layer or pattern itself and/or in the optional intermediate layer or pattern. Further, if a material is present in the top layer or pattern in particulate form it may be randomly distributed in the top layer or pattern and may thus, also be used for identification and/or authentification and/or tracking purposes (in addition to the density and/or mean diameter of the randomly distributed craters and the (optionally modified) optical properties of the CLCP layer or pattern itself, and the one or more materials which may optionally be present in the CLCP layer or pattern, and in addition to the one or more materials which may be present in the optional intermediate layer or pattern, as set forth above).

The CLCP layer or as set forth above (optionally in combination with one or more intermediate and/or top layers or patterns as set forth above) may be used for identifying, authenticating and/or tracking an article or item having the layer or pattern thereon.

Merely by way of example, a method of marking a substrate, article or item may comprise providing the substrate, article or item with a marking that comprises the CLCP layer or pattern, reading data obtained from, and being representative of the marking and recording and storing the read data in a computer database. A method of identifying and/or authenticating and/or tracking the marked substrate, article or item may comprise, for example, reading data obtained from, and being representative of the marking and comparing the read data with the data previously recorded and stored in the computer database. The read data may relate to, for example, one or more optical properties of the CLCP layer or pattern or a part thereof ((including, e.g., circular reflected polarized light, position of at least one spectral reflection band, etc.) and the density, position and/or mean diameter of the randomly distributed craters in the layer or pattern or a part thereof, and any combination of these properties. The read data may additionally relate to the optical (e.g., absorption, reflectance, fluorescence, luminescence), magnetic and/or other properties (e.g., positional and/or size distribution properties in the case of particulate matter) of materials which may optionally be present in the CLCP layer or pattern or a part thereof and/or may be present in an optional intermediate layer or pattern and/or in an optional top layer or pattern.

A reading device suitable for use in the above methods may comprise, for example, at least illumination elements and optical detection elements. Alternatively or additionally, it may comprise elements for magnetic detection. A non-limiting example of a device which may be suitable as reading device is a mobile phone.

One of the advantages of the randomly distributed craters in the CLCP layer or pattern is the overt effect that the craters provide, with an almost 3D or motion effect when looking at the craters at different angles. It is virtually impossible to reproduce this effect when photocopying, thereby providing a corresponding security feature. In contrast to CLCP flakes (which are similar to a small mirror and are viewed under specular observation) and pigments, the craters can be viewed under any observation angle, whereby all of the craters can participate in the generation of a code. This is due to the generally round shape of the edges of the craters. This is very advantageous when the code is to be read by a mobile phone because there is no need for a specific external device linked to the phone to detect the nature of the flakes (IR, UV etc.). The code can be based merely upon physical characteristics of the craters. Further, although the distribution of the craters is purely random, the distribution is within a controlled range of values based on various parameters which affect the density and/or mean diameter of the craters. Non-limiting examples of these parameters include the development time, the difference in surface tension between the substrate and/or the intermediate layers and the coating composition (CLCP precursor composition), the nature and quantities of optionally employed additives, the coating thickness and the viscosity of the coating composition.

Merely by way of example, the (random) distribution of the craters in the CLCP layer or pattern or a part thereof can be exploited for identification and/or authentification and/or tracking purposes by determining the coordinates of the craters in a (preferably orthogonal) x-y coordinate system in a previously selected reference area of the layer or pattern using a reading device and storing the determined coordinates in a computer database. The authenticity of the layer or pattern can later be verified by scanning the reference area with a suitable reading device (e.g., a mobile phone) and comparing the coordinates of at least some of the craters in the reference area with the previously recorded and stored coordinates of the craters in the reference area. Corresponding methods are already known for use with randomly distributed particles. See, e.g., U.S. Pat. No. 7,687,271, the entire disclosure of which is incorporated by reference herein.

Another technique to create a code with the security device according to the present invention, is to computationally generate a grid which contains a determined number of cells and superposed with informatics means (e.g., computer software) the corresponding grid. In a cell of said grid where there is at least a part of a crater, creating corresponding coordinates or defining with a 0 or 1 value of a binary code. The corresponding created codes can be stored in a database or a memory of a portable device for future comparison.

It further has to be appreciated that the medium that contains the randomly distributed craters, i.e., the CLCP layer or pattern, is itself capable of providing a code that is virtually impossible to reproduce, whereby a further layer of security is provided by a corresponding marking. To sum up, a marking in accordance with the present invention offers a number of characteristics which can be exploited—alone or in combination—for identification and/or authentication and/or tracking purposes. These characteristics include density of craters, mean diameter of craters, and distribution (and in some cases, shape) of craters in the CLCP layer or pattern or a part thereof, as well as various characteristic optical (spectral) properties of the CLCP layer or pattern containing these craters (including, e.g., circular reflected polarized light, position of at least one spectral reflection band, visibility with the unaided eye, etc.), which optical properties may optionally be modified in one or more areas of the CLCP layer or pattern. In addition, the number of exploitable characteristics provided by the marking according to the present invention can even be increased by characteristics of various optional features such as, for example, the detectable properties of optional intermediate and/or top layers or patterns (which may comprise CLCP materials themselves) and the detectable properties of materials (e.g. particles) which may optionally be contained (e.g., randomly distributed) in the intermediate and/or top layers or patterns and/or in the CLCP layer or pattern according to the present invention itself.

Still further, instead of a CLCP layer as the layer that includes the craters, the layer can be formed by any material into which random craters can be formed therein, such as various polymer materials. Moreover, the CLCP layer as well as any layer that includes the craters can be made by any technique wherein the craters can be randomly formed therein.

The following examples are intended to illustrate the invention without restricting it.

EXAMPLES

Employed materials
(1) UV-curable transparent coating composition (transparent varnish) for intermediate layer (% by weight):

| | |
|---|---|
| Photocryl DP 143[1] | 42.9 |
| Ebecryl 140[2] | 20.8 |
| PETIA[3] | 15.4 |
| ACMO[4] | 5.5 |
| HDDA[5] | 5.4 |
| Irgacure 907[6] | 4.2 |
| Genocure ITX[7] | 0.7 |
| Darocure 1173[8] | 3.2 |
| Aerosil R 972[9] | 1.5 |
| Tego Airex 920[10] | 0.4 |
| | 100 |

[1]low-viscosity amine-modified polyester acrylate oligomer
[2]ditrimethylolpropane tetraacrylate (reactive diluent)
[3]pentaerythritol tetraacrylate (reactive diluent)
[4]acryloyl morpholine
[5]hexanediol diacrylate (reactive diluent)
[6]2-methyl-1-[4-(methylthio)phenyl]-2-(4-morpholinyl)-1-propanone (photoinitiator)
[7]2-isopropylthioxanthone (photoinitiator)
[8]2-hydroxy-2-methyl-1-phenylpropan-1-one (photoinitiator)
[9]fumed silica aftertreated with dimethyldichlorosilane
[10]silicone-free organic polymer (defoamer and dearator)

(2) Precursor composition for CLCP layer (% by weight):

| | |
|---|---|
| Cyclohexanone | 28.9 |
| 2-Butanone | 28.9 |
| Nematic | 35.1 |
| Cholesteric | 6.2 |
| Irgacure 907 | 0.7 |
| Genocure ITX | 0.1 |
| Zonyl FSN-100[11] | 0.1 |
| | 100 |

[11]water-soluble, ethoxylated non-ionic fluorosurfactant (3) White paper printed with a commercially available black UV ink to render it dark is used as substrate.

Example 1

The dark substrate (3) was coated by applying a layer of the transparent varnish (1) (thickness 12 µm) using a laboratory k-bar coater available from Erichsen. Thereafter the varnish was dried (polymerized) using an Aktiprint mini 18-2 UV dryer available from Technigraf.

A layer of the CLCP precursor composition (2) (thickness 4 µm) was applied on the dried transparent varnish using the same k-bar coater as before, and the coated sample was rapidly placed under a hot air flux generated by a Hotwind S 100V available from Leister placed 30 cm above the sample. The sample was left under the hot air flux for a development time of about 26 s (26.1 s measured with a chronometer). The hot air blower was set in such a way that the surface was contacted by air of about 70° C. During the development time, volatile materials evaporated, the chiral liquid crystal phase developed and craters appeared all over the surface. The liquid crystal composition was then dried using the previously used Aktiprint mini 18-2 UV dryer.

As shown in FIG. 1, which is a photograph of the sample surface (real size 6.05×4.35 cm), the formed craters were randomly distributed. The density and the average diameter randomly distributed. The density and the average diameter of the craters were determined to be 16.3 craters per cm$^2$ with a mean diameter of 822 µm.

Example 2

The procedure set forth in Example 1 was repeated, with the exception that development time was only about 20 s (20.15 s measured with a chronometer).

Figure 2:
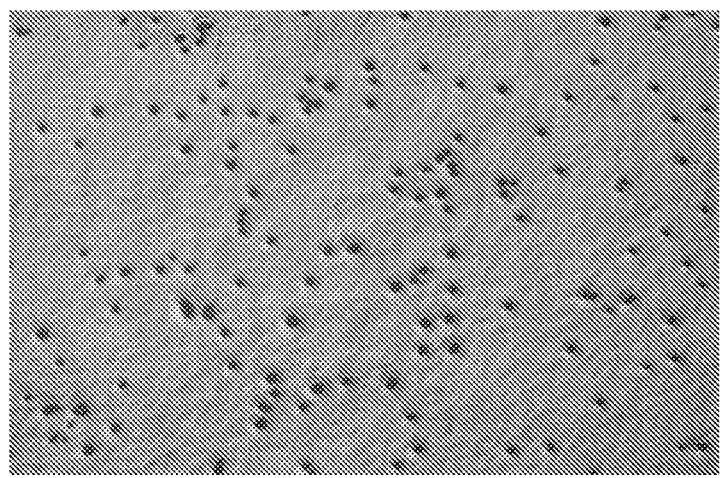
FIG. 2 is a photograph of a second embodiment of a CLCP layer with randomly distributed craters according to the present invention.

As shown in FIG. 2, which is a photograph of the sample surface (real size 6.44×4.21 cm) the craters that developed during the heating step were again randomly distributed. In this example, the density and the average diameter of the craters were 4.7 craters per cm$^2$ and 746 µm, respectively.

The table below sets forth the density and the mean diameter of the formed craters for different development times and layer thicknesses of the applied CLCP precursor composition.

| thickness [µm] | 4 | 4 | 4 | 4 | 6 | 6 | 6 | 12 | 12 |
|---|---|---|---|---|---|---|---|---|---|
| development time [s] | 7.98 | 15 | 21.32 | 26.1 | 15.02 | 20.21 | 25.37 | 10.37 | 20.2 |
| mean diameter [µm] | 343 | 443 | 733 | 822 | 501 | 640 | 761 | 421 | 746 |
| density [cm$^2$] | 17.8 | 17.2 | 17.4 | 16.3 | 10.3 | 12.2 | 14.1 | 4.0 | 4.7 |

Figure 3:
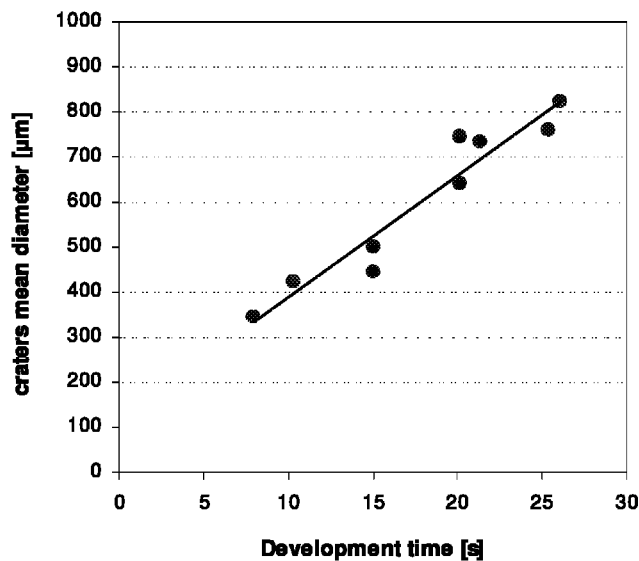
FIG. 3 is a graph showing the mean diameter of the formed craters as a function of the development time.
Figure 4:
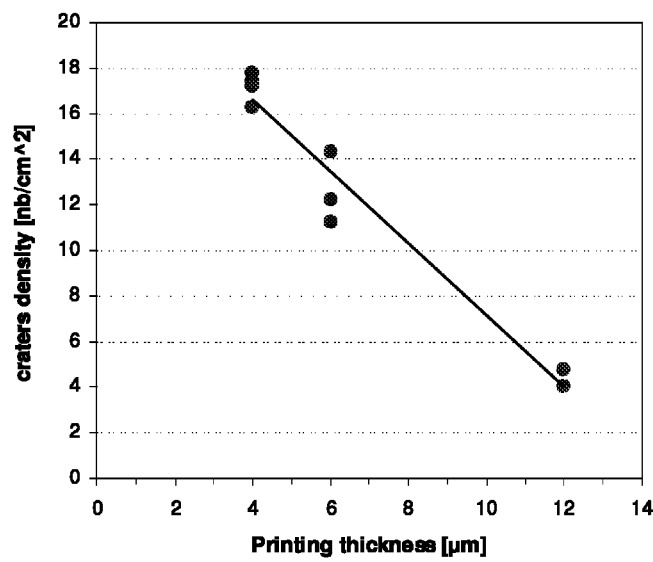
FIG. 4 is a graph showing the density of the formed craters as a function of the thickness of the applied layer of CLCP precursor composition.

FIG. 3 shows in graphic form the increase of the mean (average) diameter of the craters with increasing development time. Further, the graph of FIG. 4 shows that the crater density decreases with increasing thickness of the applied layer of CLCP precursor composition.

As can be taken from the results set forth above and in the Figures, the average diameter and the surface density of craters in a layer or pattern made from a CLCP precursor composition can be tuned/adjusted by adjusting the thickness of the applied layer of CLCP precursor composition and the development time. It thus is possible to create in a controlled manner a pattern of randomly distributed craters that can be used as a unique identifier of a CLCP layer or pattern (e.g., in the form of a marking).

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A chiral liquid crystal polymer (CLCP) layer or pattern, comprising randomly distributed craters of controlled mean diameter, wherein the randomly distributed craters of controlled mean diameter have a mean diameter of from 100 µm to 1000 µm, and the mean diameter is the average largest dimension as determined based on the largest dimensions of at least 10 craters in a selected area of the CLCP layer or pattern.

2. The CLCP layer or pattern according to claim 1, which is produced by applying a CLCP precursor composition onto a substrate in the form of a layer or pattern that comprises randomly distributed craters in at least a part of the layer or pattern and controlling at least one parameter which affects the mean diameter of the randomly distributed craters.

3. The CLCP layer or pattern according to claim 2, wherein the at least one parameter is selected from one or more of the degree of wetting of the substrate by the CLCP precursor composition, the length of the time period elapsing between the application and the curing of the CLCP precursor composition, the thickness of the applied layer or pattern of the CLCP precursor composition, the viscosity of the CLCP precursor composition, and the method of applying the CLCP precursor composition onto the substrate.

4. The CLCP layer or pattern according to claim 2, wherein the CLCP precursor composition comprises at least one nematic compound, at least one chiral dopant, at least one photoinitiator and, optionally, at least one solvent.

5. The CLCP layer or pattern according to claim 2, wherein at least some of the craters are invisible to the unaided human eye.

6. The CLCP layer or pattern according to claim 2, wherein at least in one area of the layer or pattern the average number of craters per $cm^2$ of layer or pattern is from 1 to 500.

7. The CLCP layer or pattern according to claim 2, wherein the color-shift properties of the layer or pattern across the layer or pattern are non-uniform.

8. The CLCP layer or pattern according to claim 2, wherein the CLCP layer or pattern further comprises at least one material having at least one detectable property.

9. The CLCP layer or pattern according to claim 8, wherein the at least one material is selected from one or more of flakes, fibers, inorganic compounds, organic compounds, dyes, pigments, absorber materials absorbing electromagnetic radiation in the UV and/or visible and/or IR range, luminescent materials, fluorescent materials, phosphorescent materials, colored materials, photochromic materials, thermochromic materials, magnetic materials, and materials having one or more detectable particle size distributions.

10. The CLCP layer or pattern according to claim 8, wherein said at least one material comprises a functionality which allows it to become chemically bonded to the CLCP precursor composition for making the layer or pattern.

11. A substrate which comprises on at least a part thereof the CLCP layer or pattern according to claim 1.

12. The substrate according to claim 11, wherein the substrate is or comprises at least one of a label, packaging, a cartridge, a container or a capsule that contains foodstuffs, nutraceuticals, pharmaceuticals, or beverages, a banknote, a credit card, a stamp, a tax label, a security document, a passport, an identity card, a driver's license, an access card, a transportation ticket, an event ticket, a voucher, an ink-transfer layer, a reflective layer, an aluminum foil, a semi-conductor, and a commercial good.

13. The substrate according to claim 11, wherein at least a part of the CLCP layer or pattern is present in the form of one or more of an image, a picture, a logo, indicia, and a pattern representing a code selected from one or more of a 1-dimensional barcode, a stacked 1-dimensional barcode, a 2-dimensional barcode, a 3-dimensional barcode, a cloud of dots, and a data matrix.

14. The substrate according to claim 11, wherein at least one intermediate layer or pattern is present between the substrate and the CLCP layer or pattern in at least one area of the surface of the substrate that has the CLCP layer or pattern thereon.

15. The substrate according to claim 11, wherein the at least one intermediate layer or pattern comprises a UV-cured varnish.

16. The substrate according to claim 15, wherein the UV-cured varnish is IR transparent.

17. The substrate according to claim 14, wherein the at least one surface of the substrate and/or the at least one intermediate layer or pattern comprises at least one material having at least one detectable property that is different from a property of the CLCP layer or pattern.

18. The substrate according to claim 14, wherein the at least one surface of the substrate and/or the at least one intermediate layer or pattern comprises one or more areas having a design, the design or part thereof being within a perimeter of a crater.

19. The substrate according to claim 18, wherein the design has a surface area that is smaller than an area of an opening of a crater, whereby the design is exposed by the opening.

20. The substrate according to claim 18, wherein the design comprises at least one of a microdot, a microtaggant, a micromarking, a micro alphanumeric character, and a cloud of dots.

21. The substrate according to claim 14, wherein the substrate and/or the at least one intermediate layer or pattern includes at least one area that has a non-uniform optical property across its surface.

22. The substrate according to claim 21, wherein the non-uniform optical property includes a color variation and/or a pattern variation.

23. The substrate according to claim 14, wherein the at least one intermediate layer or pattern comprises in at least a part thereof a CLCP material that has at least one optical property which is different from an optical property of the CLCP layer or pattern.

24. The substrate according to claim 11, including at least one transparent layer or pattern which is present on top of at least a part of the CLCP layer or pattern.

25. The substrate according to claim 24, wherein the at least one transparent layer or pattern comprises at least one material having at least one detectable property that is different from a property of the CLCP layer or pattern.

26. A method of forming a chiral liquid crystal polymer (CLCP) layer or pattern comprising randomly distributed craters of controlled mean diameter, wherein the randomly distributed craters of controlled mean diameter have a mean diameter of from 100 μm to 1000 μm, and the mean diameter is the average largest dimension as determined based on the largest dimensions of at least 10 craters in a selected area of the CLCP layer or pattern, comprising applying a CLCP precursor composition onto a substrate in the form of a layer or pattern, optionally heating the applied composition to promote the chiral liquid crystal state thereof, and curing the CLCP precursor composition to form the layer or pattern on the substrate, wherein the applying the CLCP precursor composition onto the substrate results in the random formation of craters in at least a part of the CLCP layer or pattern, the mean diameter of the randomly distributed craters of controlled mean diameter formed in the CLCP layer or pattern being controlled by controlling at least one parameter selected from one or more of the degree of wetting of the substrate by the CLCP precursor composition, the length of the time period elapsing between the application and the curing of the CLCP precursor composition, the thickness of the applied layer or pattern of the CLCP precursor composition, the viscosity of the CLCP precursor composition, and the method of applying the CLCP precursor composition onto the substrate.

27. A marking comprising a chiral liquid crystal polymer (CLCP) layer or pattern, the CLCP polymer layer or pattern comprising randomly distributed craters of controlled mean diameter permitting identification of the marking, wherein the randomly distributed craters of controlled mean diameter have a mean diameter of from 100 µm to 1000 µm, and the mean diameter is the average largest dimension as determined based on the largest dimensions of at least 10 craters in a selected area of the CLCP layer or pattern.

28. The marking according to claim 27, wherein an interrelationship between mean diameter and density of the randomly distributed craters permits identification of the marking.

29. A marking comprising a chiral liquid crystal polymer (CLCP) layer or pattern, the CLCP polymer layer or pattern comprising randomly distributed craters, the craters having a mean diameter of from 100 µm to 1000 µm, the mean diameter being the average largest dimension as determined based on the largest dimensions of at least 10 craters in a selected area of the CLCP layer or pattern, and in at least one area of the layer or pattern, the average number of craters per $cm^2$ of layer or pattern is from 1 to 500.

30. A method of marking an article or an item comprising applying the marking according to claim 27 on an item or article.

31. A method of authenticating an article or item, comprising applying the marking according to claim 27 to the article or item, reading data obtained from the marking, and comparing the mean diameter of the craters with a mean diameter previously determined for the marking to authenticate the article or item.

32. The method according to claim 31, wherein at least one optical property of the CLCP layer or pattern is additionally detected.

33. A method of at least one of identifying and tracking an article or item, comprising applying the marking according to claim 27 to the article or item, reading data obtained from the marking and comparing the mean diameter and distribution of the craters with a mean diameter and distribution of craters previously determined for the marking to identify and/or track the article or item.

34. The method according to claim 33, wherein at least one optical property of the CLCP layer or pattern is additionally detected.

* * * * *